(12) United States Patent
Furui et al.

(10) Patent No.: US 11,441,260 B2
(45) Date of Patent: Sep. 13, 2022

(54) SHEET-LIKE MATERIAL

(71) Applicant: Toray Industries, Inc., Tokyo (JP)

(72) Inventors: Takanori Furui, Gifu (JP); Makoto Kaneko, Otsu (JP); Ryuji Shikuri, Gifu (JP); Gen Koide, Otsu (JP); Hirohito Yamamoto, Otsu (JP); Makoto Nishimura, Otsu (JP); Jun Yoshida, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 305 days.

(21) Appl. No.: 16/497,206

(22) PCT Filed: Mar. 27, 2018

(86) PCT No.: PCT/JP2018/012446
§ 371 (c)(1),
(2) Date: Sep. 24, 2019

(87) PCT Pub. No.: WO2018/181319
PCT Pub. Date: Oct. 4, 2018

(65) Prior Publication Data
US 2020/0095725 A1 Mar. 26, 2020

(30) Foreign Application Priority Data

Mar. 29, 2017 (JP) .............................. JP2017-064595
Apr. 21, 2017 (JP) .............................. JP2017-084275

(51) Int. Cl.
| | |
|---|---|
| *D06M 15/564* | (2006.01) |
| *B32B 5/02* | (2006.01) |
| *B32B 5/26* | (2006.01) |
| *C08J 5/04* | (2006.01) |
| *C08L 67/02* | (2006.01) |
| *C08L 75/04* | (2006.01) |
| *D06M 101/32* | (2006.01) |

(52) U.S. Cl.
CPC .......... *D06M 15/564* (2013.01); *B32B 5/022* (2013.01); *B32B 5/26* (2013.01); *C08J 5/046* (2013.01); *C08L 67/02* (2013.01); *C08L 75/04* (2013.01); *B32B 2262/0276* (2013.01); *C08J 2367/02* (2013.01); *C08J 2375/04* (2013.01); *C08J 2425/04* (2013.01); *C08J 2467/02* (2013.01); *C08J 2475/04* (2013.01); *C08L 2205/025* (2013.01); *C08L 2205/03* (2013.01); *C08L 2205/16* (2013.01); *C08L 2205/22* (2013.01); *D06M 2101/32* (2013.01)

(58) Field of Classification Search
CPC .......... D06N 3/00; D06N 3/14; D06N 3/136; D06N 3/0004; D06N 3/0011; D06N 3/0036; D06N 2211/28; D06M 15/564; D06M 2101/32; C08L 2205/16; C08L 67/02; C08L 75/04; C08J 2367/02; C08J 2467/02; C08J 2475/04; C08J 5/046; C08J 5/04; C08J 2375/04; B32B 2262/0276; B32B 5/022; B32B 5/28; D03D 15/33; C09J 275/04; C09D 175/04; C09D 175/06; D10B 2331/04; D01F 6/84; D01F 8/14; D04H 1/43838; D04H 1/435; C08G 63/16
USPC ................ 428/15, 904; 252/182.21, 182.22; 521/159, 160; 442/275, 319, 189, 164, 442/340, 361, 327, 328, 333, 334
See application file for complete search history.

(56) References Cited

U.S. PATENT DOCUMENTS

| | | |
|---|---|---|
| 4,013,702 A | 3/1977 | Cartier et al. |
| 4,105,641 A | 8/1978 | Buysch et al. |
| 4,145,518 A | 3/1979 | Morie et al. |
| 4,524,104 A | 6/1985 | Hagio et al. |
| 5,112,421 A | 5/1992 | Honda et al. |

(Continued)

FOREIGN PATENT DOCUMENTS

| | | |
|---|---|---|
| CN | 104884499 A | 9/2015 |
| JP | 5641652 U | 4/1981 |

(Continued)

OTHER PUBLICATIONS

International Search Report and Written Opinion for Application No. PCT/JP2018/012446 dated May 29, 2018, 6 Pages.

(Continued)

*Primary Examiner* — Camie S Thompson
(74) *Attorney, Agent, or Firm* — RatnerPrestia

(57) ABSTRACT

The present invention provides a sheet-like material in which a plant-derived raw material of low environmental impact is used. The invention also provides a sheet-like material that ideally has a uniform and refined nap and a sheet-like material that is strong, has excellent shape stability, is lightweight and is very pliable. This sheet-like material is characterized in being made of nonwoven fabric that is made of polyester microfiber containing a 1,2-propanediol-derived component in an amount prescribed in the present application and a polyurethane elastomer resin containing structural monomers prescribed in the present application. This sheet-like material is also made of a base sheet, in which a nonwoven fabric that has microfibers as the main component is laminated and unified with a woven or knitted material, and an elastomer resin, and is characterized in that the woven or knitted material is configured from fibers containing polyester as the main component and that 1-500 ppm of a 1,2-propanediol-derived component are contained in the polyester.

3 Claims, No Drawings

(56) References Cited

U.S. PATENT DOCUMENTS

| | | | |
|---|---|---|---|
| 10,316,130 B2 | 6/2019 | Kusano et al. | |
| 2009/0124829 A1 | 5/2009 | Gong | |
| 2014/0058059 A1 | 2/2014 | Okubo et al. | |
| 2015/0252524 A1 | 9/2015 | Nishimura et al. | |
| 2019/0375935 A1* | 12/2019 | Shikuri | C08G 18/44 |

FOREIGN PATENT DOCUMENTS

| | | | |
|---|---|---|---|
| JP | 6278281 A | 4/1987 | |
| JP | 2005171226 A | 6/2005 | |
| JP | 2005240197 A | 9/2005 | |
| JP | 2007197890 A | 8/2007 | |
| JP | 2008075237 A | 4/2008 | |
| JP | 2014065980 | * | 4/2014 |
| JP | 2016027114 A | 2/2016 | |
| JP | 2016027119 A | 2/2016 | |
| WO | 2009064515 A1 | 5/2009 | |
| WO | 2013035559 A1 | 3/2013 | |
| WO | 2014034780 A1 | 3/2014 | |

OTHER PUBLICATIONS

Extended European Search Report for European Application No. 18777598.6, dated Nov. 23, 2020, 14 pages.

Chinese Office Action for Chinese Application No. 201880020905.1, dated Jul. 22, 2021, 7 pages.

Indian Examination Report for Indian Application No. 20197038656, dated Dec. 29, 2021, with translation, 5 pages.

* cited by examiner

SHEET-LIKE MATERIAL

CROSS REFERENCE TO RELATED APPLICATIONS

This is the U.S. National Phase application of PCT/JP2018/012446, filed Mar. 27, 2018, which claims priority to Japanese Patent Application No. 2017-064595, filed Mar. 29, 2017, and Japanese Patent Application No. 2017-084275, filed Apr. 21, 2017, the disclosures of each of these applications being incorporated herein by reference in their entirety for all purposes.

FIELD OF THE INVENTION

The present invention relates to a sheet-like material, and more particularly, to a sheet-like material having piloerection.

BACKGROUND OF THE INVENTION

Sheet-like materials having a surface of a suede or nubuck-like feeling by having piloerection on the surface of the sheet-like material obtained by impregnating a base material including a fiber with an elastomer resin, are widely known. The characteristics of the sheet-like material to be intended can be arbitrarily designed in a wide range by a combination of a base material including a fiber and an elastomer resin. As the fiber, a polyester fiber is widely used, because of the mechanical strength, chemical stability, and low cost thereof. Further, as the elastomer resin, a polyurethane resin is widely used, since durability and texture can be controlled by a combination of diol types and the like.

Generally, polyesters, especially polyethylene terephthalate is produced from a terephthalic acid or an ester-forming derivative thereof and ethylene glycol, and likewise, a polyurethane resin is produced from various polymer diols and isocyanates, but these raw materials are all usually obtained from fossil resources. Petroleum, which is a fossil resource, is an important raw material of the chemical industry, but there is a concern of depletion in the future. Furthermore, since a large amount of carbon dioxide is emitted during a production process and incineration disposal, a series of problems such as global warming are caused. Under these circumstances, much attention has been focused on recycled raw materials and materials with a low environmental load.

A biomass resource is a material from obtained a plant which converts water and carbon dioxide into a raw material by photosynthesis, and includes starch, carbohydrate, cellulose, lignin, and the like. Since the biomass resource uses carbon dioxide as a raw material during the production process, the material using the biomass resource cannot newly emit carbon dioxide even in the case of being subjected to incineration after its use to be decomposed into carbon dioxide and water, and in some cases, is taken into a plant again, and thus, can be referred to as renewable resource. Therefore, in the case that this biomass resource can be used as a substitute for a petroleum resource, a decrease of a fossil resource is suppressed and an emission amount of carbon dioxide is also suppressed.

From such a background, various attempts have been made to synthesize a polyester fiber and a polyurethane resin from a renewable biomass resource. Examples thereof include polyethylene terephthalate (PET) using plant-derived ethylene glycol as a raw material and polycarbonate-based polyurethane using plant-derived polymer diol as a raw material.

Meanwhile, studies on enhancing quality, durability, and texture of the above-described sheet-like material are also actively conducted. For example, a method of enhancing abrasion characteristics of fiber by enhancing heat resistance of polyester using plant-derived ethylene glycol has been proposed (see Patent Document 1).

Further, Patent Documents 2 and 3 propose a method of combining polycarbonate diols having the different number of carbon atoms to achieve both low temperature characteristics and flexible texture (see Patent Documents 2 and 3).

Furthermore, when the sheet-like material is used in a skin material such as a car seat or a chair, distortion may occur on the skin material due to long-term repeated use, and thus, a method of forming a sheet-like material having high strength, low elongation, and high flexibility by entangling and integrating a woven or knitted fabric with the inside of a nonwoven fabric or one side of a nonwoven fabric, has been proposed (see Patent Document 4).

As a method of further enhancing the mechanical properties of the sheet-like material, an artificial leather substrate formed by composing a woven or knitted fabric of a high-strength polyvinyl alcohol-based synthetic fiber (high-strength vinylon fiber) and a wholly aromatic polyamide fiber (aramid fiber) and entangling and integrating the woven or knitted fabric with a nonwoven fabric, has been proposed (see Patent Document 5).

PATENT DOCUMENTS

Patent Document 1: Pamphlet of International Publication No. 2014/034780
Patent Document 2: Japanese Patent Laid-open Publication No. 2016-27119
Patent Document 3: Japanese Patent Laid-open Publication No. 2016-27114
Patent Document 4: Japanese Patent Laid-open Publication No. S62-78281
Patent Document 5: Japanese Patent Laid-open Publication No. 2005-240197

SUMMARY OF THE INVENTION

In Patent Document 1, a study of a napped sheet-like material having a uniform and elegant piloerection quality has not been sufficient. Further, Patent Documents 2 and 3 still have a flexibility problem, and a study on a sheet-like material having piloerection has not also been insufficient. Furthermore, in Patent Document 4, when a woven or knitted fabric and a nonwoven fabric are entangled and integrated by a needle punch, the woven or knitted fabric is damaged by the needle, and the mechanical properties inherent to the woven or knitted fabric cannot be sufficiently utilized. Further, when a density of the woven or knitted fabric in anticipation of such damage is increased for compensating for the strength of the fabric, there is a problem that it is disadvantageous for the purposes of increasing rigidity of the woven or knitted fabric and obtaining flexible artificial leather. In Patent Document 5, damage by the needle is decreased, but there is a problem in that the rigidity of the woven or knitted fabric is high and the resulting artificial leather substrate had poor flexibility, as in the case in which the density of the woven or knitted fabric is increased.

Therefore, in view of the above background art of the prior art, an object of the present invention is to provide a sheet-like material including plant-derived components having a low environmental load. More specifically, an object of the present invention is to provide a napped sheet-like material having uniform and elegant piloerection, even in the case of using a fiber containing plant-derived components and an elastomer resin. Another object of the present invention is to provide a sheet-like material which has high strength, excellent form stability, a light weight, and high flexibility, using a woven or knitted fabric including a fiber containing plant-derived components.

In order to solve these objects, a sheet-like material according to an aspect of the present invention includes a nonwoven fabric including a microfiber having an average single fiber diameter of 0.3 to 7 μm, and an elastomer resin, in which a polymer constituting the microfiber is a polyester obtained from a dicarboxylic acid and/or an ester-forming derivative thereof and a diol, a 1,2-propanediol-derived component is contained at 1 to 500 ppm in the polyester, and the elastomer resin is a polyurethane resin (D) including a copolymerized polycarbonate diol (A1) that includes a structural unit derived from an alkanediol (a1) having 3 to 5 carbon atoms and a structural unit derived from an alkanediol (a2) having 8 to 20 carbon atoms and that has a molar ratio of the alkanediol (a2) to a total number of moles of the alkanediol (a1) and the alkanediol (a2) of 50 to 95 mol %, an organic diisocyanate (B), and a chain extender (C) as essential constituent monomers.

According to a preferred embodiment of the sheet-like material of the present invention, the sheet-like material has piloerection on the surface thereof and the elastomer resin is present in an interior space of the nonwoven fabric.

According to a preferred embodiment of the sheet-like material of the present invention, the polyurethane resin (D) further includes a polycarbonate diol (A2) including a structural unit derived from an alkanediol (a3) having 4 to 6 carbon atoms as an essential constituent monomer.

According to a preferred embodiment of the sheet-like material of the present invention, the elastomer resin has a porous structure and a proportion of micropores having a pore diameter of 0.1 to 20 μm occupying all pores of the porous structure is 60% or more.

Further, a sheet-like material according to another aspect of the present invention includes a sheet substrate formed by laminating and integrating a nonwoven fabric having a microfiber as a main body with a woven or knitted fabric, and an elastomer resin, in which the woven or knitted fabric is composed of fibers including polyester as a main component, and a 1,2-propanediol-derived component is contained at 1 to 500 ppm in the polyester.

According to a preferred embodiment of the sheet-like material of the present invention, a single fiber diameter of a yarn constituting the woven or knitted fabric is 0.3 to 50 μm.

According to the aspect of the present invention, since a plant-derived component is used in a microfiber and an elastomer resin, the sheet-like material is an environmentally friendly material and also heat resistance of a polymer is improved, and since abrasion resistance of the fiber is improved and the alkanediol in the elastomer resin has a specific composition, grindability of the elastomer resin at the time of piloerection processing is improved, thereby obtaining a napped sheet-like material having uniform and elegant piloerection. Further, heat resistance of a polymer is improved, abrasion resistance of a fiber is improved, and the damage to a woven or knitted fabric in the sheet-like material is reduced, thereby obtaining a sheet-like material having a light weight, high flexibility, high strength, and excellent form stability, in which it is not necessary to increase the density of the woven or knitted fabric in anticipation of the damage to the woven or knitted fabric.

DETAILED DESCRIPTION OF EMBODIMENTS OF THE INVENTION

The sheet-like material of the present invention includes a nonwoven fabric including a microfiber having an average single fiber diameter of 0.3 to 7 μm, and an elastomer resin, in which a polymer constituting the microfiber is a polyester obtained from a dicarboxylic acid and/or an ester-forming derivative thereof and a diol, a 1,2-propanediol-derived component is contained at 1 to 500 ppm in the polyester, and the elastomer resin is a polyurethane resin (D) including a copolymerized polycarbonate diol (A1) that includes a structural unit derived from an alkanediol (a1) having 3 to 5 carbon atoms and a structural unit derived from an alkanediol (a2) having 8 to 20 carbon atoms and that has a molar ratio of the alkanediol (a2) to a total number of moles of the alkanediol (a1) and the alkanediol (a2) of 50 to 95 mol %, an organic diisocyanate (B), and a chain extender (C) as essential constituent monomers.

The sheet-like material of the present invention is a sheet-like material including a nonwoven fabric including a microfiber having an average single fiber diameter of 0.3 to 7 μm and an elastomer resin.

As the microfiber constituting the nonwoven fabric, polyester obtained from a dicarboxylic acid and/or an ester-forming derivative thereof (hereinafter, also referred to as a dicarboxylic acid component) and a diol, that is, polyethylene terephthalate, polybutylene terephthalate, polytrimethylene terephthalate, and the like can be used. Further, it is allowed that microfibers of different materials are mixed in the nonwoven fabric.

The polyester used in the present invention is obtained from a dicarboxylic acid component and a diol, and the content of a 1,2-propanediol-derived component contained in the polyester is in a range of 1 to 500 ppm, and preferably in a range of 10 to 400 ppm. When the content of the 1,2-propanediol-derived component in the resulting polyester is more than 500 ppm, heat resistance of the polyester is lowered, and when the content is less than 1 ppm, an effect of improving heat resistance is not expressed.

The 1,2-propanediol-derived component as referred to herein is a total amount of 1,2-propanediol detected when the polyester is decomposed and analyzed, and represents a total amount of 1,2-propanediol, including a 1,2-propanediol-derived structure, copolymerized in a polymer chain and 1,2-propanediol intermixed between polymers. That is, this 1,2-propanediol may be partially copolymerized in a polyester main chain and also is contained as a single substance without being copolymerized.

Examples of the dicarboxylic acid and/or the ester-forming derivative thereof used in the present invention include aliphatic carboxylic acids such as terephthalic acid, isophthalic acid, naphthalene dicarboxylic acid (for example, 2,6-naphthalene dicarboxylic acid), diphenyl dicarboxylic acid (for example, diphenyl-4,4'-dicarboxylic acid), oxalic acid, malonic acid, succinic acid, glutaric acid, adipic acid, pimelic acid, suberic acid, azelaic acid, sebacic acid, undecanedioic acid, and dodecandioic acid, alicyclic dicarboxylic acids such as cyclohexanedicarboxylic acid and 1,4-cyclohexanedicarboxylic acid, aromatic dicarboxylic acids such as a 5-sulfoisophthalic acid salt (such as lithium 5-sulfoisophthalate salt, potassium 5-sulfoisophthalate salt, and sodium 5-sulfoisophthalate salt), the ester-forming derivative thereof, and the like. The ester-forming derivative thereof in the present invention means lower alkyl esters, acid anhydrides, acyl chlorides, and the like of these dicarboxylic acids, and for example, methyl ester, ethyl ester, hydroxyethyl ester, and the like are preferably used. A more preferred embodiment as the dicarboxylic acid and/or the ester-forming derivative thereof used in the present invention is a terephthalic acid and/or a dimethyl ester thereof.

Further, as the terephthalic acid and/or the dimethyl ester thereof, those derived from a plant can be used. Examples of a method of obtaining a plant-derived terephthalic acid include a method in which p-cymene is synthesized from cineol obtained from an *Eucalyptus* genus plant (see Bulletin of the Chemical Society of Japan, (2), P 217-219, 1986), and then the terephthalic acid is obtained via p-methyl benzoic acid (Organic Syntheses, 27, 1947). Examples of still another method include a method of obtaining a terephthalic acid from furan dicarboxylic acid and ethylene by a Diels-Alder reaction (see WO 2009-064515). The thus-obtained plant-derived terephthalic acid is allowed to be further converted into an ester-forming derivative thereof.

Examples of the diol used in the present invention include diol components, such as ethylene glycol, 1,3-propanediol, 1,4-butanediol, 1,5-pentanediol, 1,6-hexanediol, cyclohexanedimethanol, diethylene glycol, 2-methyl-1,3-propanediol, polyoxyalkylene glycol having a molecular weight of 500 to 20000 (such as polyethylene glycol), and a bisphenol A-ethylene oxide adduct, and among them, ethylene glycol is preferably used. Furthermore, as the ethylene glycol, since plant-derived ethylene glycol often contains 1,2-propanediol, it is more preferred to use plant-derived ethylene glycol having a content adjusted by purification.

Examples of a method of obtaining plant-derived ethylene glycol include a method of obtaining it from corn, sugar cane, wheat, stems of agricultural crops, and the like. In the method, the raw materials are first converted to starch, the starch is converted to glucose with water and enzyme, which is subsequently converted to sorbitol by a hydrogenation reaction, the sorbitol is subsequently converted to a mixture of various glycols by a hydrogenation reaction in the presence of a catalyst at constant temperature and pressure, and the mixture is purified to obtain the ethylene glycol.

A ratio of the plant-derived component can be determined as a theoretical value by performing radioactive carbon (C14) concentration analysis according to a bio-based concentration test standard defined in ASTM D6866 to determine and calculate ratios of plant-derived carbon and fossil fuel-derived carbon.

In the present invention, the plant-derived ratio of the resulting polyester is preferably 10% by mass or more, more preferably 15% by mass or more, and it is a preferred embodiment that the plant-derived ratio is high.

The polyester used in the present invention is preferably polyethylene terephthalate obtained using terephthalic acid and/or dimethyl ester thereof as a dicarboxylic acid component and ethylene glycol as a diol component, and when the polyester is a polyester copolymer mainly containing an ethylene terephthalate unit, an effect of improving heat resistance becomes more significant.

As the copolymerization component of the polyester used in the present invention, the structural units derived from the following components can be contained. For example, structural units derived from aliphatic carboxylic acids such as oxalic acid, malonic acid, succinic acid, glutaric acid, pimelic acid, suberic acid, azelaic acid, sebacic acid, undecanedioic acid, and dodecanedioic acid, alicyclic dicarboxylic acids such as cyclohexanedicarboxylic acid, and aromatic dicarboxylic acids such as terephthalic acid, isophthalic acid, naphthalenedicarboxylic acid, diphenyldicarboxylic acid, 1,4-cyclohexanedicarboxylic acid, isophthalic acid, a 5-sulfoisophthalic acid salt (such as lithium 5-sulfoisophthalte salt, potassium 5-sulfoisophthalate salt, and sodium 5-sulfoisophthalate salt) can be contained. Further, examples of the diol component include diol components, such as 1,3-propanediol, 1,4-butanediol, 1,5-pentanediol, 1,6-hexanediol, polyoxyalkylene glycol having a molecular weight of 500 to 20000 (such as polyethylene glycol), diethylene glycol, 2-methyl-1,3-propanediol, and a bisphenol A-ethylene oxide adduct.

Among them, 5-sulfoisophthalic acid salts such as a lithium 5-sulfoisophthalate salt, a potassium 5-sulfoisophthalate salt, and a sodium 5-sulfoisophthalate salt, and the ester-forming derivative thereof, and a polyoxyalkylene glycol having a molecular weight of 500 to 20000 are preferably used. As the polyoxyalkylene glycol, polyethylene glycol is preferred, and polyethylene glycol having a molecular weight of 500 to 10000 is particularly preferred.

It is preferred that the 5-sulfoisophthalic acid salt is copolymerized at 0.1 to 10 mol % based on the total dicarboxylic acid component constituting the polyester, and it is preferred that the polyoxyalkylene glycol having a molecular weight of 500 to 20000 is copolymerized at 0.1 to 10.0% by mass based on the mass of the resulting polyester.

These copolymerization components may be used alone, but when used in combination of two or more, an effect of improving heat resistance becomes significant.

The polyester containing the copolymerization component is suitably used as, for example, a sea component of a sea-island type composite fiber (eluting component). As in the case of an island component forming the microfiber, by containing 1,2-propanediol-derived component, solubility relative to usual polyester is improved due to an inhibitory effect of crystallinity and the like, and thus, the polyester can be used more suitably.

The polyester-based polymer constituting the microfiber including the polyester used in the present invention can contain an additive such as particles, a flame retardant, and an antistatic agent.

The cross-sectional shape of the microfiber used in the present invention may be a round cross section, and those of ellipse, flatness, polygons such as triangle, and modified cross section such as a fan shape and a cross shape can be adopted.

In the present invention, it is important that the average single fiber diameter of the microfiber constituting the nonwoven fabric is 7 μm or less, from a viewpoint of flexibility and piloerection quality of the sheet-like material of the present invention. The average single fiber diameter is preferably 6 μm or less, and more preferably 5 μm or less. Meanwhile, it is important that the average single fiber diameter of the microfiber is 0.3 μm or more, from a viewpoint of coloration after dyeing, dispersibility of a bundled fiber at the time of piloerection processing by buffing, and ease of untangling. The average single fiber diameter is preferably 0.7 μm or more, and more preferably 1 μm or more.

The average single fiber diameter referred to herein is determined by observing three cross sections obtained by cutting the resulting sheet-like material in a thickness direction with a scanning electron microscope (SEM), measuring the fiber diameter of 50 arbitrary microfibers per one cross section, and calculating the average value of the fiber diameters of a total of 150 fibers.

As the form of the nonwoven fabric, a nonwoven fabric in which each of the single fibers of the microfiber is entangled or a nonwoven fabric formed by entangling fiber bundles of the microfiber can be used, but the nonwoven fabric formed by entangling fiber bundles of the microfiber is preferably used, from a viewpoint of strength and texture of the sheet-like material. From a viewpoint of flexibility and texture, particularly preferably, a nonwoven fabric having a proper void between the microfibers inside the fiber bundle is preferably used. Thus, the nonwoven fabric formed by entangling the fiber bundles of the microfiber can be obtained by, for example, previously entangling the microfiber-expressed fiber and then expressing the microfiber. Further, the nonwoven fabric having a proper void between the microfibers inside the fiber bundle can be obtained by, for example, using a sea-island type composite fiber which can have a proper void between island components, that is, between the microfibers inside the fiber bundle by removing sea components.

As the nonwoven fabric, any of a short fiber nonwoven fabric and a long fiber nonwoven fabric may be used, but a short fiber nonwoven fabric is preferably used in terms of texture and quality.

It is a preferred embodiment that a fiber length of the short fiber in the short fiber nonwoven fabric is in a range of 25 to 90 mm. When the fiber length is 25 mm or more, a sheet-like material having excellent abrasion resistance can be obtained by entanglement. Further, when the fiber length is 90 mm or less, a sheet-like material having better texture and quality can be obtained. The fiber length is more preferably 35 to 80 mm, and particularly preferably 40 to 70 mm.

When the microfiber or the fiber bundle thereof constitutes the nonwoven fabric, a woven fabric or a knitted fabric (woven or knitted fabric) can be inserted, laminated, or lined, for the purpose of improving strength inside thereof. In order to obtain a sheet-like material having high strength, excellent form stability, and excellent flexibility, it is important that the nonwoven fabric including a microfiber as a main body and the woven or knitted fabric are entangled and integrated.

It is a preferred embodiment that in the woven or knitted fabric included in the sheet-like material of the present invention, the yarn of the woven or knitted fabric is a hard-twist yarn, in order to prevent damage to the fiber constituting the woven or knitted fabric by a needle punch.

The twist number of the hard-twist yarn is preferably in a range of 1000 T/m to 4500 T/m. When the twist number is preferably 1000 T/m or more, and more preferably 1500 T/m or more, in the needle punch, force of a yarn constituting the woven or knitted fabric for maintaining a rod-shaped structure of integrity is high, the single fiber constituting the yarn is not caught on the barb of the needle, and the physical properties of a product is reduced and the exposure of the product surface of the single fiber is decreased. Further, when the twist number is preferably 4500 T/m or less, and more preferably 4000 T/m or less, single fiber cutting is suppressed, the yarn (hard-twist yarn) constituting the woven or knitted fabric becomes hard, and flexible texture can be obtained.

Further, it is preferred that the single fiber diameter of the yarn constituting the woven or knitted fabric is in a range of 0.3 to 50 µm. When the single fiber diameter is preferably 5 µm or more, and more preferably 10 µm or more, in the needle punch, cutting of the yarn constituting the woven or knitted fabric is suppressed, and thus, the form stability of the product as the sheet-like material is improved, a density increase in anticipation of damage to the woven or knitted fabric is unnecessary, and the resulting sheet-like material is lightweight and highly flexible. Further, when the single fiber diameter is preferably 40 µm or less, and more preferably 20 µm or less, a sheet-like material having excellent flexibility is obtained.

The woven or knitted fabric used in the present invention is a generic term for a woven fabric or a knitted fabric, and examples of the woven fabric include a plain weave, a twill fabric, a satin weave, and the like, and examples of the knitted fabric include circular knitting, tricot, russel, and the like, a deformed texture thereof, and the like. Specifically, simple circular knitting is preferred in terms of high productivity and the like, but a woven fabric of plain weave texture is preferably used in terms of smoothness of the sheet, ease of entanglement with a microfiber generation type fiber, and a manufacturing cost.

The thickness of the woven or knitted fabric is preferably 0.10 mm to 0.40 mm, and more preferably 0.15 mm to 0.30 mm. When the thickness of the woven or knitted fabric is 0.10 mm or more, it is possible to impart better form stability to the sheet-like material. Further, when the thickness is 0.40 mm or less, piloerection fiber density unevenness by irregularity of the woven or knitted fabric inside the sheet-like material can be suppressed, and it is possible to maintain better surface quality.

In the case of using the woven fabric in the present invention, it is preferred that the woven density of the woven fabric is adjusted so that both warp yarn and weft yarn have the woven density of 40/2.54 cm (inch) to 200/2.54 cm (inch) in the sheet-like material. When the woven density of the woven fabric in the sheet-like material is 40/2.54 cm (inch) or more, a sheet-like material having excellent form stability can be obtained. On the other hand, when the woven and knitted density of the woven or knitted fabric in the sheet-like material is 200/2.54 cm (inch) or less, the texture of the sheet-like material can be flexible.

As the yarn constituting the woven or knitted fabric, synthetic fibers, for example, polyesters such as polyethylene terephthalate, polybutylene terephthalate, polytrimethylene terephthalate, and polylactic acid, and polyamides such as 6-nylon and 66-nylon, regenerated fibers such as a cellulose-based polymer, natural fibers such as cotton and hemp, and the like can be used. Among them, it is preferred to use polyester.

The polyester preferably used in the woven or knitted fabric is obtained from a dicarboxylic acid and/or an ester-forming derivative thereof and a diol, and the content of a 1,2-propanediol-derived component contained in the polyester is in a range of 1 to 500 ppm, and preferably in a range of 10 to 400 ppm. When the content of the 1,2-propanediol-derived component in the resulting polyester is more than 500 ppm, heat resistance of the polyester is lowered, and when the content is less than 1 ppm, the effect of improving heat resistance is not expressed. Since the polyester containing the 1,2-propanediol-derived component in the above range has excellent heat resistance at the time of melt molding, the woven or knitted fabric manufactured with the synthetic fiber obtained from the polyester has excellent tensile strength and abrasion characteristics. That is, when the woven or knitted fabric is used as the woven or knitted fabric in which the nonwoven fabric is entangled and integrated, damage to the fiber constituting the woven or knitted fabric due to a needle punch at the time of being entangled and integrated with the nonwoven fabric including the microfiber or the microfiber generation type fiber, can be suppressed, and thus, a density increase in anticipation of damage to the woven or knitted fabric is not necessary, and the resulting sheet-like material has excellent form stability, a light weight, and high flexibility.

The 1,2-propanediol-derived component as referred to herein is a total amount of 1,2-propanediol detected when the polyester is decomposed and analyzed, and represents a total amount of 1,2-propanediol, including a 1,2-propanediol-derived structure, copolymerized in a polymer chain and 1,2-propanediol intermixed between polymers. That is, this 1,2-propanediol may be partially copolymerized in a polyester main chain and also is contained as a single substance without being copolymerized.

Examples of the dicarboxylic acid and/or the ester-forming derivative thereof used in the polyester include terephthalic acid, isophthalic acid, 2,6-naphthalenedicarboxylic acid, diphenyl-4,4'-dicarboxylic acid, an ester-forming derivative thereof, and the like. The ester-forming derivative thereof in the present invention is lower alkyl esters, acid anhydrides, acyl chlorides, and the like of these dicarboxylic acids, and specifically, methyl ester, ethyl ester, hydroxyethyl ester, and the like are preferably used. A more preferred embodiment as the dicarboxylic acid and/or the ester-forming derivative thereof used in the present invention is a terephthalic acid and/or a dimethyl ester thereof.

Further, as the terephthalic acid and/or the dimethyl ester thereof, those derived from a plant can be used. Examples of a method of obtaining a plant-derived terephthalic acid include a method in which p-cymene is synthesized from cineol obtained from a *Eucalyptus* genus plant (see Bulletin of the Chemical Society of Japan, (2), P 217-219, 1986), and then the terephthalic acid is obtained via p-methyl benzoic acid (Organic Syntheses, 27, 1947). Examples of still another method include a method of obtaining a terephthalic acid from furan dicarboxylic acid and ethylene by a Diels-Alder reaction (see WO 2009-064515). The thus-obtained plant-derived terephthalic acid is allowed to be further converted into an ester-forming derivative thereof.

Further, examples of the diol include ethylene glycol, 1,3-propanediol, 1,4-butanediol, cyclohexane dimethanol, and the like, and among them, ethylene glycol is preferably used. Furthermore, as the ethylene glycol, since plant-derived ethylene glycol often contains 1,2-propanediol, it is more preferred to use plant-derived ethylene glycol having a content adjusted by purification.

Examples of a method of obtaining plant-derived ethylene glycol include a method of obtaining it from corn, sugar cane, wheat, stems of agricultural crops, and the like. In the method, the raw materials are first converted to starch, the starch is converted to glucose with water and enzyme, which is subsequently converted to sorbitol by a hydrogenation reaction, the sorbitol is subsequently converted to a mixture of various glycols by a hydrogenation reaction in the presence of a catalyst at constant temperature and pressure, and the mixture is purified to obtain the ethylene glycol.

A ratio of the plant-derived component can be determined as a theoretical value by performing radioactive carbon (C14) concentration analysis according to a bio-based concentration test standard defined in ASTM D6866 to determine and calculate ratios of plant-derived carbon and fossil fuel-derived carbon.

In the present invention, the plant-derived ratio of the resulting polyester is preferably 10% by mass or more, more preferably 15% by mass or more, and it is a preferred embodiment that the plant-derived ratio is high.

The polyester used in the woven or knitted fabric of the present invention is preferably polyethylene terephthalate obtained using terephthalic acid and/or dimethyl ester thereof as a dicarboxylic acid component and/or an ester-forming derivative component thereof and ethylene glycol as a diol component, and when the polyester is present as a polyester copolymer mainly containing an ethylene terephthalate unit, an effect of improving heat resistance becomes more significant.

As the copolymerization component of the polyester used in the woven or knitted fabric, structural units derived from the following components can be contained. For example, structural units derived from aliphatic carboxylic acids such as oxalic acid, malonic acid, succinic acid, glutaric acid, pimelic acid, suberic acid, azelaic acid, sebacic acid, undecanedioic acid, and dodecanedioic acid, alicyclic dicarboxylic acids such as cyclohexanedicarboxylic acid, and aromatic dicarboxylic acids such as terephthalic acid, isophthalic acid, naphthalenedicarboxylic acid, diphenyldicarboxylic acid, 1,4-cyclohexanedicarboxylic acid, isophthalic acid, a 5-sulfoisophthalic acid salt (such as lithium 5-sulfoisophthalte salt, potassium 5-sulfoisophthalate salt, and sodium 5-sulfoisophthalate salt) can be contained. Further, examples of the diol component include diol components, such as 1,3-propanediol, 1,4-butanediol, 1,5-pentanediol, 1,6-hexanediol, polyoxyalkylene glycol having a molecular weight of 500 to 20000 (such as polyethylene glycol), diethylene glycol, 2-methyl-1,3-propanediol, and a bisphenol A-ethylene oxide adduct.

The polyester-based polymer including the polyester used in the present invention can contain an additive such as particles, a flame retardant, and an antistatic agent.

The elastomer resin in the present invention is a polyurethane resin (D). The polyurethane resin (D) includes a copolymerized polycarbonate diol (A1), an organic diisocyanate (B), and a chain extender (C) as essential constituent monomers.

The copolymerized polycarbonate diol (A1) is a copolymerized polycarbonate diol that includes a structural unit derived from an alkanediol (a1) having 3 to 5 carbon atoms and a structural unit derived from an alkanediol (a2) having 8 to 20 carbon atoms, and that has a molar ratio of the alkanediol (a2) to a total number of moles of the alkanediol (a1) and the alkanediol (a2) of 50 to 95 mol %.

The molar ratio of the alkanediol (a2) to a total number of moles of the alkanediol (a1) and the alkanediol (a2) is 50 to 95 mol %, preferably 55 to 90 mol %, and more preferably 60 to 85 mol %. When the molar ratio of the alkanediol (a2) is greater than 95 mol %, the crystallinity of the polyurethane resin becomes too high, and the texture of the sheet-like material becomes worse. Further, when the molar ratio of the alkanediol (a2) is less than 50 mol %, the crystallinity of the polyurethane resin is lost, and the abrasion resistance of the sheet-like material is lowered.

The alkanediol (a1) and the alkanediol (a2) are used alone or in combination. Further, as the alkanediol (a1) and the alkanediol (a2), both of a linear alkanediol and a branched alkanediol are used, but from a viewpoint of chemical resistance, low temperature characteristics, and durability, a linear alkanediol is preferably used.

When the alkanediol (a1) and the alkanediol (a2) are branched alkanediols, the number of branch points of the carbon chain is preferably 2 or less, and more preferably 1, from a viewpoint of chemical resistance, low temperature characteristics, and durability. When there is a branched chain, the smaller the number of carbons of the branched chain, the better the chemical resistance, the low temperature characteristics, and heat resistance, and the number of carbon is preferably 2 or less, and more preferably 1.

The alkanediol (a1) has 3 to 5 carbon atoms, and when the alkanediol has 2 or less carbon atoms, handling is not easy. When the alkanediol has 6 or more carbon atoms, durability and mechanical strength are impaired. It is preferred that the alkanediol (a1) has 3 or 4 carbon atoms from ease of availability.

Examples of the alkanediol (a1) include 1,3-propanediol, 1,2-propanediol, 2-methyl-1,3-propanediol, 1,3-butanediol, 1,4-butanediol, 2-methyl-1,4-butanediol, 1,5-pentanediol, and the like. Preferred are 1,3-propanediol, 1,4-butanediol, and 1,5-pentanediol, and more preferred is 1,4-butanediol.

The alkanediol (a2) has 8 to 20 carbon atoms, and when the alkanediol has 7 or less carbon atoms, the crystallinity of the copolymerized polycarbonate diol (A1) becomes high to harden the texture of the sheet-like material. When the alkanediol has 21 or more carbon atoms, the crystallinity of the copolymerized polycarbonate diol (A1) is too low, and the durability and the abrasion resistance of the sheet-like material are impaired.

It is preferred that the alkanediol (a2) has 8, 10, and 12 carbon atoms from ease of availability. Examples of the alkanediol (a2) include 5-methyl-2,4-heptanediol, 2-methyl-1,7-heptanediol, 1,8-octanediol, 2-methyl-1,8-octanediol, 1,9-nonanediol, 1,10-decanediol, 1,11-undecanediol, and 1,12-dodecanediol, and the like. Preferred are 1,8-octanediol, 1,9-nonanediol, 1,10-decanediol, 1,11-undecanediol, and 1,12-dodecanediol, more preferred are 1,9-nonanediol, 1,10-decanediol, and 1,12-dodecanediol, and particularly preferred is 1,10-decanediol.

It is preferred that the alkanediol (a1) and the alkanediol (a2) are derived from plants, from a viewpoint of environmental load reduction. Examples of the plant-derived alkanediol (a1) include 1,3-propanediol, 1,4-butanediol, 1,5-propanediol, and the like. Examples of the plant-derived alkanediol (a2) include 1,9-nonanediol, 1,10-decanediol, 1,11-undecanediol, 1,12-dodecanediol, 1,13-tridecanediol, 1,18-octadecanediol, and the like.

The plant-derived alkanediol (a1) and alkanediol (a2) all include those produced by the following production method. For example, in the case of 1,4-butanediol, 1,4-butanediol can be produced from succinic acid obtained by a fermentation method, succinic anhydride, succinate ester, maleic acid, maleic anhydride, maleate ester, tetrahydrofuran, γ-butyrolactone, and the like by chemical synthesis, can be directly produced by the fermentation method, and also, can be produced from 1,3-butanediol obtained by the fermentation method. Among these methods, a method of directly producing 1,4-butanediol by a fermentation method and a method of hydrogenating succinic acid with a reduction catalyst to obtain 1,4-butanediol are effective and preferably used.

Further, in the case of 1,3-propanediol, 1,3-propanediol is obtained by producing 3-hydroxypropionaldehyde from glycerol, glucose, and other saccharides by a fermentation method, and then further converting it to 1,3-propanediol, or directly producing 1,3-propanediol from glucose and other saccharides by the fermentation method.

In the case of 1,10-decanediol, 1,10-decanediol can be synthesized by synthesizing sebacic acid from castor oil by alkali melting and hydrogenating the sebacic acid directly or after an esterification reaction.

A plant-derived ratio can be determined as a theoretical value by performing radioactive carbon (C14) concentration analysis according to a bio-based concentration test standard defined in ASTM D6866 to determine and calculate ratios of plant-derived carbon and fossil fuel-derived carbon.

The copolymerized polycarbonate diol (A1) used in the present invention is crystalline and can be represented by a heat of fusion ($\Delta H$) of a melting peak determined by a melting point measurement method using a differential operating calorimeter specified in JIS K 7121-1987, and the heat of fusion is preferably 40 to 100 J/g, more preferably 45 to 90 J/g, and still more preferably 50 to 75 J/g. When the heat of fusion ($\Delta H$) is 40 J/g or more, durability and abrasion resistance can be expressed, and when the heat of fusion is 100 J/g or less, texture becomes good.

In the polyurethane resin (D) used in the present invention, a polycarbonate diol (A2) can be used. The polycarbonate diol (A2) is a polycarbonate diol that includes a structural unit derived from an alkanediol (a3) having preferably 4 to 6 carbon atoms and that has a heat of fusion ($\Delta H$) specified above of 0 J/g. The polycarbonate diol (A2) may or may not be a copolymer, but it is a preferred embodiment that the polycarbonate diol (A2) is a copolymer.

The alkanediol (a3) has preferably 4 to 6 carbon atoms, and when the alkanediol has 4 or more carbon atoms, the crystallinity of the polycarbonate diol (A2) is lowered and the texture of the sheet-like material becomes flexible, and when the alkanediol has 6 or less carbon atoms, the crystallinity of the copolymerized polycarbonate diol (A2) is maintained and the durability and abrasion resistance of the sheet-like material can be expressed. The alkanediol (a3) can be used alone or in combination.

Examples of the alkanediol (a3) having 4 to 6 carbon atoms include 1,4-butanediol, 1,5-pentanediol, 2-methyl-1,3-propanediol, neopentyl glycol, 1,6-hexanediol, 3-methyl-1,5-pentanediol, and a mixed diol of two or more thereof, more preferably, the alkanediol (a3) is 1,4-butanediol, 1,5-pentanediol, 1,6-hexanediol, 3-methyl-1,5-pentanediol, and a mixed diol of two or more thereof, and still more preferably, the alkanediol (a3) is 1,6-hexanediol, 3-methyl-1,5-hexanediol, and a mixed diol thereof.

The polycarbonate diol (A2) is non-crystalline and this can be confirmed by the fact that a melting peak is not observed by a melting point measurement method using a differential operating calorimeter specified in JIS K 7121-1987. When the polycarbonate diol (A2) is crystalline, the texture of the sheet-like material may be impaired.

For the ratios of the copolymerized polycarbonate diol (A1) and the polycarbonate diol (A2), the ratio of the non-crystalline polycarbonate diol (A2) is determined at the ratio which does not inhibit the crystallization of the copolymerized polycarbonate diol (A1). Specifically, as a melting point (Tm) determined by the melting point measurement method specified in JIS K 7121-1987, a difference ($\Delta Tm$) in melting points (Tm) between a mixture (A12) of the copolymerized polycarbonate diol (A1) and the polycarbonate diol (A2) and the copolymerized polycarbonate diol (A1) is 1.5° C. or less, preferably 1.0° C. or less, and more preferably 0.8° C. or less. When the difference ($\Delta Tm$) in melting points (Tm) is 1.5° C. or less, durability and abrasion resistance can be expressed.

For the ratio of the copolymerized polycarbonate diol (A1) and the polycarbonate diol (A2), the heat of fusion ($\Delta H$) of the mixture (A12) of the copolymerized polycarbonate diol (A1) and the polycarbonate diol (A2) is preferably in a range of 10 to 55 J/g, more preferably in a range of 20 to 50 J/g, and in a still more preferred embodiment, in a range of 25 to 45 J/g, from a viewpoint of texture, durability, and abrasion resistance.

The molar ratio of the copolymerized polycarbonate diol (A1) to a total number of moles of the copolymerized polycarbonate diol (A1) and the polycarbonate diol (A2) is preferably 30 to 80 mol %, and more preferably 40 to 70 mol %. When the molar ratio of the copolymerized polycarbonate diol (A1) is 30 mol % or more, durability of the sheet-like material is better, and when the molar ratio is 80 mol % or less, texture of the sheet-like material is better.

The number average molecular weight of the copolymerized polycarbonate diol (A1) and the polycarbonate diol (A2) is preferably 500 or more, more preferably 700 or more, and still more preferably 1000 or more, from a viewpoint of texture. Further, the number average molecular weight is preferably 5000 or less, more preferably 4500 or less, and still more preferably 4000 or less, from a viewpoint of strength.

The number average molecular weights of the copolymerized polycarbonate diol (A1) and the polycarbonate diol (A2) are determined from a hydroxyl value. The hydroxyl value is measured by the method specified in JIS K 0070-1992 (potentiometric titration method).

Examples of a method of producing the copolymerized polycarbonate diol (A1) and the polycarbonate diol (A2) include a transesterification method of carbonate ester such as diphenylcarbonate and dimethyl carbonate and diol. For detail, various methods are included, which are described in for example, the specification of U.S. Pat. No. 4,013,702, the specification of U.S. Pat. No. 4,105,641, Schnell, Polymer Reviews, Vol. 9, pages 9 to 20 (1964), and the like. The specification of U.S. Pat. No. 4,013,702 and the specification of U.S. Pat. No. 4,105,641 disclose synthesis of a copolymerized polycarbonate diol of 1,6-hexanediol and 1,4-butanediol. These all disclose a method of producing the copolymerized polycarbonate diol.

Examples of the copolymerized polycarbonate diol (A1) include 1,8-octanediol/1,3-propanediol copolymerized polycarbonate diol, 1,8-octanediol/1,4-butanediol copolymerized polycarbonate diol, 1,8-octanediol/1,5-pentanediol copolymerized polycarbonate diol, 1,9-nonanediol/1,3-propanediol copolymerized polycarbonate diol, 1,9-nonanediol/1,4-butanediol copolymerized polycarbonate diol, 1,9-nonanediol/1,5-pentanediol copolymerized polycarbonate diol, 1,10-decanediol/1,3-propanediol copolymerized polycarbonate diol, 1,10-decanediol/1,4-butanediol copolymerized polycarbonate diol, 1,10-decanediol/1,5-pentanediol copolymerized polycarbonate diol, 1,12-dodecanediol/1,3-propanediol copolymerized polycarbonate diol, 1,12-dodecanediol/1,4-butanediol copolymerized polycarbonate diol, 1,12-dodecanediol/1,5-pentanediol copolymerized polycarbonate diol, and a mixed copolymerized polycarbonate diol of two or more thereof.

Among them, preferred examples of the copolymerized polycarbonate diol (A1) include 1,8-octanediol/1,4-butanediol copolymerized polycarbonate diol, 1,9-nonanediol/1,4-butanediol copolymerized polycarbonate diol, 1,10-decanediol/1,4-butanediol copolymerized polycarbonate diol, 1,12-dodecanediol/1,4-butanediol copolymerized polycarbonate diol, and a mixed copolymerized polycarbonate diol of two or more thereof, and the particularly preferred copolymerized polycarbonate diol (A1) is 1,10-decanediol/1,4-butanediol copolymerized polycarbonate diol.

Examples of the polycarbonate diol (A2) include, as an example of a homopolymer, 2-methyl-1,3-propanediol polycarbonate diol, neopentyl glycol polycarbonate diol, 2-ethyl-1,3-propanediol polycarbonate diol, 3-methyl-1,5-pentanediol polycarbonate diol, and the like, and a mixed polycarbonate diol of two or more thereof.

Further, examples of a copolymer include 1,4-butanediol/1,5-pentanediol copolymerized polycarbonate diol, 1,4-butanediol/1,6-hexanediol copolymerized polycarbonate diol, 1,5-pentanediol/1,6-hexanediol copolymerized polycarbonate diol, 2-methyl-1,3-propanediol/1,6-hexanediol copolymerized polycarbonate diol, neopentyl glycol/1,6-hexanediol copolymerized polycarbonate diol, 3-methyl-1,5-pentanediol/1,6-hexanediol copolymerized polycarbonate diol, 2-ethyl-1,3-propanediol/1,6-hexanediol copolymerized polycarbonate diol, and the like, and a mixed copolymerized polycarbonate diol of two or more thereof. Among them, preferred examples of the copolymer include 1,5-pentanediol/1,6-hexanediol copolymerized polycarbonate diol, neopentyl glycol/1,6-hexanediol copolymerized polycarbonate diol, 2-ethyl-1,3-propanediol/1,6-hexanediol copolymerized polycarbonate diol, 3-methyl-1,5-pentanediol/1,6-hexanediol copolymerized polycarbonate diol, and a mixed copolymerized polycarbonate diol of two or more thereof, and the particularly preferred copolymer is 3-methyl-1,5-pentanediol/1,6-hexanediol copolymerized polycarbonate diol.

As a diol component of the polyurethane resin (D) used in the present invention, another polymer diol (A4) can be used in combination within a range which does not adversely affect performance, in addition to the copolymerized polycarbonate diol (A1) and the polycarbonate diol (A2). The polymer diol (A4) can be used in combination preferably at 0 to 40 mol %, more preferably at 5 to 35 mol %, relative to the total number of moles of the copolymerized polycarbonate diol (A1) and the polycarbonate diol (A2).

Examples of the polymer diol (A4) include polyether diol and polyester diol, and the number average molecular weight thereof is preferably 500 to 5,000, and more preferably 1,000 to 4,000.

Examples of the polyether diol include a compound having a structure in which an alkylene oxide (hereinafter, sometimes abbreviated to AO) is added to a low molecular weight diol, and a mixture of two or more thereof.

Examples of the low molecular weight diol include ethylene glycol, diethylene glycol, propylene glycol, 1,4-butanediol, 1,3-butanediol, neopentyl glycol, 1,6-hexanediol, 3-methyl-1,5-pentanediol; low molecular weight diols having a ring structure [bis(hydroxymethyl)cyclohexane, bis(hydroxyethyl)benzene, an ethylene oxide adduct of bisphenol A, and the like], and a mixture of two or more thereof.

Examples of AO include ethylene oxide (hereinafter, sometimes abbreviated to EO), propylene oxide (hereinafter, sometimes abbreviated to PO), tetrahydrofuran (hereinafter, sometimes abbreviated to THF), 3-methyl-tetrahydrofuran (hereinafter, sometimes abbreviated to 3-M-THF), and the like.

AO may be used alone or in combination of two or more, and when used in combination of two or more, block addition, random addition, or a mixed system of both can be used. Among these AO, preferred AO is EO alone, PO alone, THF alone, 3-M-THF alone, PO and EO in combination, PO and/or EO and THF in combination, and THF and 3-M-THF in combination (in the case of being in combination, random, block, and a mixed system of both).

Specific examples of the polyether diol include polyethylene glycol, polypropylene glycol, polytetramethylene ether glycol (hereinafter, sometimes abbreviated to PTMG), poly-3-methyl-tetramethylene ether glycol, THF/EO copolymerization diol, THF/3-M-THF copolymerization diol, and the like. Among them, the particularly preferred polyether diol is PTMG.

Addition of AO to the low molecular weight diol can be carried out by a common method. For example, addition is carried out in one step or multiple steps under normal pressure or under pressure, in the absence or presence of a catalyst (alkali catalyst, amine-based catalyst, or acidic catalyst) (particularly, in a second half step of AO addition).

Examples of the polyester diol include polyester diol obtained by reacting a low molecular diol and/or polyether diol having a molecular weight of 1000 or less with a dicarboxylic acid, and a polylactonediol obtained by ring-opening polymerization of lactone.

Examples of the low molecular weight diol, ethylene glycol, diethylene glycol, propylene glycol, 1,4-butanediol, 1,3-butanediol, neopentyl glycol, 1,6-hexanediol, 3-methyl-1,5-pentanediol; low molecular weight diols having a ring structure [bis(hydroxymethyl)cyclohexane, bis(hydroxyethyl)benzene, an ethylene oxide adduct of bisphenol A, and the like], and a mixture of two or more thereof.

Further, examples of the dicarboxylic acid include aliphatic dicarboxylic acids such as succinic acid, adipic acid, azelaic acid, and sebacic acid, aromatic dicarboxylic acids such as terephthalic acid, isophthalic acid, and phthalic acid, ester-forming derivatives of these dicarboxylic acids [acid anhydrides and lower alkyl (having 1 to 4 carbon atoms) esters, and the like], and a mixture of two or more thereof. Examples of the lactone include ε-caprolactone, γ-butyrolactone, γ-valerolactone, and a mixture of two or more thereof.

The polyester diol can be produced by a conventional method, for example, a method of condensation reaction of a low molecular weight diol with a dicarboxylic acid, or addition of lactone to an initiator (low molecular weight diol).

Specific examples of the low molecular weight diol include polyethylene adipate diol, polybutylene adipate diol, polyneopentyl adipate diol, polyhexamethylene adipate diol, polyethylene butylene adipate diol, polydiethylene adipate diol, polybutylene sebacate diol, polycaprolactone diol, and the like.

The organic diisocyanate (B) used in the present invention includes aromatic diisocyanates having 6 to 20 carbon atoms (excluding carbons in an NCO group, the same applies hereinafter), aliphatic diisocyanates having 2 to 18 carbon atoms, alicyclic diisocyanates having 4 to 15 carbon atoms, araliphatic diisocyanates having 8 to 15 carbon atoms, modified bodies of these diisocyanates (a carbodiimide modified body, a urethane modified body, a uretdione modified body, and the like), and a mixture of two or more thereof.

Specific examples of the aromatic diisocyanate include 1,3- and/or 1,4-phenylene diisocyanate, 2,4- and/2,6-tolylene diisocyanate, 2,4'- and/or 4,4'-diphenylmethane diisocyanate (hereinafter abbreviated to MDI), 4,4'-diisocyanatobiphenyl, 3,3'-dimethyl-4,4'-diisocyanatobiphenyl, 3,3'-dimethyl-4,4'-diisocyanatodiphenylmethane, and 1,5-naphthylene diisocyanate, and the like.

Specific examples of the aliphatic diisocyanate include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl) carbonate, 2-isocyanatoethyl-2,6-diisocyanatohexaate, and the like.

Specific examples of the alicyclic diisocyanate include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylates, 2,5- and/or 2,6-norbornane diisocyanate, and the like.

Specific examples of the araliphatic diisocyanate include m- and/or p-xylyl diisocyanate, α,α,α',α'-tetramethylxylylene diisocyanate, and the like.

Among them, the preferred diisocyanate is the aromatic diisocyanate, and the particularly preferred aromatic diisocyanate is MDI.

Further, examples of the chain extender (C) include low molecular weight diols such as ethylene glycol, propylene glycol, 1,3-butylene glycol, 1,4-butanediol, 1,6-hexanediol, diethylene glycol, and neopentyl glycol, alicyclic diols such as 1,4-bis(hydroxymethyl) cyclohexane, aromatic diols such as 1,4-bis(hydroxyethyl) benzene, aliphatic diamines such as ethylene diamine, alicyclic diamines such as isophorone diamine, aromatic diamines such as 4,4-diaminodiphenylmethane, and araliphatic diamines such as xylenediamine, alkanolamines such as ethanolamine, hydrazines, dihydrazides such as adipic acid dihydrazide, and a mixture of two or more thereof.

Among them, the chain extender (C) is preferably water, low molecular weight diols, and aromatic diamines, and more preferably water, ethylene glycol, 1,4-butanediol, 4,4'-diaminodiphenylmethane, and a mixture of two or more thereof.

Further, it is preferred that the number average molecular weight of the chain extender (C) is 250 or less.

In the polyurethane resin (D) used in the present invention, the ratio of the organic diisocyanate (B) is preferably 0.95 or more and 1.1 or less, and more preferably 0.97 or more and 1.05 or less, relative to the total amount of active hydrogen groups including the copolymerized polycarbonate diol (A1), polycarbonate diol (A2), and chain extender (C), since the polyurethane resin having a high degree of polymerization can be produced.

The ratio of the active hydrogen groups of the chain extender (C) is preferably 0.2 or more and 10 or less, and more preferably 0.5 or more and 5 or less, relative to the total amount of active hydrogen groups of the copolymerized polycarbonate diol (A1) and the polycarbonate diol (A2).

Examples of the method of producing the polyurethane resin (D) of the present invention include preferably, a one short method of simultaneously reacting the polycarbonate diol (A), the organic diisocyanate (B), and the chain extender (C), a prepolymer method of first reacting the polycarbonate diol (A) and the organic diisocyanate (B) to obtain a urethane prepolymer, which is then further reacted with the chain extender (C), and the like.

The reaction temperature of the urethanization reaction is preferably 20 to 160° C., and more preferably 40 to 80° C. If necessary, a polymerization terminator, for example, monoalcohols (such as methanol, ethanol, butanol, and cyclohexanol), monoamines (such as diethylamine, dibutylamine, and cyclohexylamine), and the like can be used.

In order to accelerate the reaction, if necessary, a catalyst which is preferably used in the urethanization reaction [for example, amine-based catalysts (such as triethylamine and triethylenediamine), tin-based catalysts (such as dibutyltin dilaurate and dioctyltin dilaurate), and the like] can be used. The used amount of the catalyst is preferably 1% by mass or less relative to the polyurethane resin (D).

Production of the polyurethane resin (D) used in the present invention is carried out in the presence or absence of an organic solvent, and when being carried out in the absence of the organic solvent, the polyurethane resin can be produced by a method in which the organic solvent is added later, or after a solid resin is produced once, the resin is dissolved in the solvent, and the like.

Examples of the organic solvent (G) used in the production of the polyurethane resin (D) include amide-based solvents [such as N,N-dimethylformamide (hereinafter, abbreviated to DMF), N,N-dimethylacetamide, and N-methylpyrrolidone]; sulfoxide-based solvents [such as dimethyl sulfoxide (hereinafter, sometimes abbreviated to DMSO)]; ketone-based solvents (such as methyl ethyl ketone); ether-based solvents (such as dioxane and THF); ester-based solvents (such as methyl acetate, ethyl acetate, and butyl acetate); aromatic-based solvents (such as toluene and xylene), and the like, and a mixture of two or more thereof. Among these solvents, a preferred solvent is the amide-based solvent, and particularly preferred is DMF.

To the polyurethane resin (D), if necessary, various stabilizers, for example, a coloring agent such as titanium oxide, an ultraviolet absorber (such as benzophenone-based and benzotriazole-based), or an antioxidant [such as, hindered phenols such as 4,4-butylidene-bis(3-methyl-6-1-butylphenol); and organic phosphites such as triphenyl phosphite and trichloroethyl phosphite], an inorganic filler (such as calcium carbonate) and a known coagulation regulator [higher alcohols; cetyl alcohol, stearyl alcohol, and the like (Japanese Patent Publication No. S42-22719), crystalline organic compound; purified octadecyl alcohol, purified stearyl alcohol, and the like (Japanese Patent Publication No. S56-41652), a hydrophobic nonionic surfactant; sorbitan monostearate, sorbitan palmitate, and the like (Japanese Patent Publication No. S45-39634 and Japanese Patent Publication No. S45-39635), and the like can be added. The total added amount (content) of each of these additives is preferably 10% by mass or less, and more preferably 0.5 to 5% by mass, relative to the polyurethane resin (D).

The coagulation value (gelling point) of the polyurethane resin (D) used in the present invention is preferably 2 ml or more, more preferably 2.3 ml or more, and still more preferably 2.5 ml or more, from a viewpoint of coagulation rate. Further, the coagulation value (gelling point) is preferably 5 ml or less, more preferably 4.7 ml or less, and still more preferably 4.5 ml or less.

The coagulation value (gelling point) refers to the following: a 1% by mass DMF solution of a polyurethane resin is prepared, and while the temperature of 100 g of the solution is adjusted to 25° C., water at a temperature of 25° C. is dropped with stirring with a stirrer. At this time, the coagulation value is the amount of dropped water (ml) required for the solution (transparent solution) to be cloudy.

The coagulation value (gelling point) represents a degree of hydrophilicity of the polyurethane resin, and is an indicator of the coagulation rate of the polyurethane resin when the solution of the polyurethane resin is applied to a substrate to be wet-coagulated. For example, when a high molecular weight diol having high hydrophobicity is used, the coagulation value of the polyurethane resin is decreased, and when a high molecular weight diol having high hydrophilicity is used, the coagulation value of the polyurethane resin is increased.

The number average molecular weight of the polyurethane resin (D) is preferably 20,000 or more from a viewpoint of resin strength, and preferably 500,000 or less from a viewpoint of viscosity stability and workability. The number average molecular weight is more preferably 30,000 or more and 150,000 or less.

The number average molecular weight of the polyurethane resin (D) can be determined by gel permeation chromatography and is measured, for example, under the following conditions.

Apparatus: HLC-8220 manufactured by Tosoh Corporation

Column: Tosoh TSKgel α-M

Solvent: DMF

Temperature: 40° C.

Calibration: polystyrene

In the polyurethane resin (D), a polyurethane resin (D1) further including a compound (A3) having a hydrophilic group and active hydrogen as an essential constituent monomer is preferably used as a polyurethane resin aqueous dispersion (P) including the polyurethane resin (D1) and water.

The mass ratio of the compound (A3) having a hydrophilic group and active hydrogen is preferably 0.5 to 14% by mass, more preferably 0.8 to 10% by mass, and particularly preferably 1 to 7% by mass, relative to the total mass of the copolymerized polycarbonate diol (A1), polycarbonate diol (A2), and the compound (A3) having a hydrophilic group and active hydrogen.

In the present invention, the hydrophilic group of the compound (A3) having a hydrophilic group and active hydrogen refers to a carboxyl group, a carboxylate group, a sulfo group, a sulfonato group, and a sulfamic acid group. Further, the active hydrogen refers to active hydrogen other than a carboxyl group and a sulfo group.

Examples of the compound (A3) having a hydrophilic group and active hydrogen include a compound having a carboxyl group with 2 to 10 carbon atoms [dialkylolalkanoic acid (for example, 2,2-dimethylol propionic acid, 2,2-dimethylol butanoic acid, 2,2-dimethylol heptanoic acid, and 2,2-dimethylol octanoic acid), tartaric acid and amino acid (for example, glycine, alanine, and valine), and the like], a compound having a sulfo group with 2 to 16 carbon atoms [3-(2,3-dihydroxypropoxy)-1-propanesulfonic acid and sulfoisophthalic acid di(ethylene glycol) ester, and the like], a compound having a sulfamic acid group with 2 to 10 carbon atoms [N,N-bis(2-hydroxylethyl) sulfamic acid and the like], and salts obtained by neutralizing these compounds with a neutralizing agent described later. Among them, the preferred compound (A3) having a hydrophilic group and active hydrogen is a compound having a carboxyl group and a carboxylate group, and among them, particularly 2,2-dimethylol propionic acid and 2,2-dimethylol butanoic acid are preferably used.

The total content of the carboxyl group and the carboxylate group in the polyurethane resin (D1) is preferably 0.09 to 0.27 mmol/g, and more preferably 0.14 to 0.25 mmol/g, based on the mass of the polyurethane resin (D1), from a viewpoint of stability of the aqueous dispersion (P) and heat resistance and weather resistance of the resulting coating film.

When the total content of the carboxyl group and the carboxylate group in the polyurethane resin (D1) is in a range of 0.09 to 0.27 mmol/g, for example, in the case in which 2,2-dimethylol propionic acid is used as the compound (A3) having a hydrophilic group and active hydrogen, the polyurethane resin (D1) is synthesized so that the mass ratio of the compound (A3) having a hydrophilic group and active hydrogen is about 1.0 to 10.0% by mass, relative to the total mass of the copolymerized polycarbonate diol (A1), polycarbonate diol (A2), and the compound (A3) having a hydrophilic group and active hydrogen.

The total content of the carboxyl group and the carboxylate group in the polyurethane resin in the present invention can be obtained by heating and drying 3 to 10 g of polyurethane resin aqueous dispersion (P) at a temperature of 130° C. for 45 minutes to obtain a residue which is then washed with water, heating and drying the washed residue again at a temperature of 130° C. for 45 minutes, dissolving the residue in dimethyl formamide, measuring an acid value by the method described in JIS K 0070:1992 (potentiometric titration method), and calculating the total content therefrom.

Examples of the neutralizing agent used in the neutralized salt of the compound (A3) having a hydrophilic group and active hydrogen include ammonia, an amine compound having 1 to 20 carbon atoms, and hydroxides of alkali metals (such as sodium, potassium, and lithium).

Examples of the amine compound having 1 to 20 carbon atoms include primary amines such as monomethylamine, monoethylamine, monobutylamine, monoethanolamine, and 2-amino-2-methyl-1-propanol, secondary amines such as dimethylamine, diethylamine, dibutylamine, diethanolamine, and N-methyldiethanolamine, and tertiary amines such as trimethylamine, triethylamine, dimethylethylamine, and triethanolamine. Among them, the preferred amine compound is an amine compound having a low vapor pressure at a temperature of 25° C. from a viewpoint of the odor of the aqueous dispersion (P) and the water resistance of the resulting coating film, and the more preferred amine compound is triethylamine, monoethanolamine, diethanolamine, and N-methyldiethanolamine.

The polyurethane resin aqueous dispersion (P) can contain a surfactant (E), a crosslinking agent (F), and a weathering stabilizer, if necessary, in the polyurethane resin (D1) containing water.

Examples of the surfactant (E) include nonionic surfactants, anionic surfactants, cationic surfactants, amphoteric surfactants, and other emulsifying dispersants. Each of the surfactants may be used alone or in combination of two or more.

The content of the surfactant (E) is preferably 0 to 20% by mass, more preferably 0.1 to 10% by mass, and particularly preferably 0.2 to 5% by mass, based on the mass of the polyurethane resin (D1), from a viewpoint of water resistance of the dry coating film.

Examples of the crosslinking agent (F) include a water-soluble or water-dispersible compound containing two or more functional groups in the molecule, capable of reacting with a carboxyl group in the polyurethane skeleton, and examples of the functional group capable of reacting with a carboxyl group include a carbodiimide group, an oxazoline group, an epoxy group, a cyclocarbonate group, an aziridine group, and the like. The crosslinking agent (F) may be used alone or in combination of two or more. The used amount of these crosslinking agents is 1.0 to 20% by mass, and more preferably 1.5 to 10% by mass, based on the mass of the polyurethane resin (D1).

As the weathering stabilizer, weathering stabilizers, such as antioxidants (such as hindered phenol-based, sulfur-based, and phosphorus-based), ultraviolet absorbers (such as benzotriazole-based, triazine-based, benzophenone-based, and benzoate-based), and hindered amine-based light stabilizers can be included. The used amount of these weathering stabilizers is preferably 0.1 to 10% by mass, and more preferably 0.2 to 5% by mass, based on the mass of the polyurethane resin (D1).

The volume average particle diameter of the polyurethane resin aqueous dispersion (P) is preferably 0.01 to 1 µm, more preferably 0.02 to 0.7 µm, and particularly preferably 0.03 to 0.5 µm, from a viewpoint of storage stability and viscosity.

The solid content concentration of the polyurethane resin aqueous dispersion (P) used in the present invention is preferably 20 to 70% by mass, and more preferably 30 to 60% by mass.

Examples of a method of producing the polyurethane resin aqueous dispersion (P) include the methods of the following [1] and [2].

[1] A method in which the copolymerized polycarbonate diol (A1), the polycarbonate diol (A2), the compound (A3) having a hydrophilic group and active hydrogen, and the aliphatic diisocyanate (B), and if necessary, an organic solvent are charged, a urethane polymer is formed in one or multiple stages, then after a hydrophilic group portion introduced by the compound (A3) having a hydrophilic group and active hydrogen is neutralized by a neutralizing agent, the aqueous medium is dispersed in the presence of the organic solvent, the chain extender (C), and if necessary, a reaction terminator, and the reaction is carried out until the isocyanate group substantially disappears and the organic solvent is distilled off.

In the production method of [1], when chain extension by the chain extender (C) and, if necessary, termination of chain extension are carried out, it is preferred that a prepolymer is dispersed in an aqueous medium, and then the chain extender (C) and, if necessary, a reaction terminator are added, from a viewpoint of stability of the polyurethane resin aqueous dispersion (P).

[2] A method in which the copolymerized polycarbonate diol (A1), the polycarbonate diol (A2), the compound (A3) having a hydrophilic group and active hydrogen, the aliphatic polyisocyanate (B), and the chain extender (C), and if necessary, an organic solvent are charged, the polyurethane resin (D1) is formed in one or multiple stages, and after a hydrophilic group portion introduced by the compound (A3) having a hydrophilic group and active hydrogen is neutralized by a neutralizing agent, dispersion in an aqueous medium is carried out in the presence or absence of the organic solvent and, if necessary, the organic solvent is distilled off.

The prepolymer in the production method of [1] is formed by the reaction at a ratio such that an equivalent ratio of isocyanate group/active hydrogen-containing group is 1.01 to 2.0. The formation of the prepolymer is carried out in the reaction at a temperature of 20° C. to 150° C., and preferably 60° C. to 110° C. and a reaction time is 2 to 15 hours. The formation of the prepolymer can be carried out in the presence or absence of an organic solvent which is substantially non-reactive with an isocyanate group. The prepolymer after the reaction contains 0.5 to 5% of a free isocyanate group.

The organic solvent used in the above reaction has a boiling point of less than 100° C. and examples thereof include those being substantially non-reactive with an isocyanate group (for example, ketones such as ethyl methyl ketone and acetone, esters such as methyl acetate and ethyl acetate, acetonitrile, tetrahydrofuran, and the like). When the organic solvent having a boiling point of 100° C. or more, it is difficult to completely remove only the organic solvent, and the organic solvent remains in the aqueous dispersion (P) and exudes at the time of processing. Further, the organic solvent easily remains in the resulting coating film to change the physical properties of the coating film with time.

In the urethanization reaction, in order to accelerate the reaction, a catalyst which is used in a common urethanization reaction can be used, if necessary. Examples of the catalyst include amine catalysts such as triethylamine, N-ethylmorpholine, triethylenediamine, and cycloamidines described in U.S. Pat. No. 4,524,104 [1,8-diaza-bicyclo(5, 4,0)undecene-7 (manufactured by San-Apro Ltd., DBU)], tin-based catalysts such as dibutyltin dilaurate, dioctyltin dilaurate, and tin octylate, titanium-based catalysts such as tetrabutyl titanate, bismuth-based catalysts such as bismuth trioctylate, and the like.

It is a preferred embodiment that the elastomer resin used in the present invention, that is, the polyurethane resin (D) has a porous structure in the sheet-like material. A proportion of the micropores having a pore diameter of 0.1 to 20 µm occupying all pores of the porous structure is preferably 60% or more. The proportion of the micropores is more preferably 65% or more, and more preferably 70% or more. Further, as the porous structure, communication holes or closed-cells can be also adopted. As such, by having micropores in the elastomer resin at a certain proportion or more, flexibility of the elastomer resin can be enhanced and the sheet-like material can have texture with high flexibility.

Further, when the elastomer resin is formed into a porous structure having micropores and bending and deformation are applied to the sheet-like material, deformation force can be dispersed in and received by the entire elastomer resin, not a part of the elastomer resin, and thus, occurrence of folding creases accompanied by buckling of the elastomer resin is suppressed, and the sheet-like material can be a sheet-like material having excellent folding crease resistance.

Further, among all the pores of the porous structure of the elastomer resin, the pore diameter of 60% or more of the pores is preferably 0.1 µm or more, more preferably 0.5 µm or more, and still more preferably 1 µm or more. When the pore diameter is 0.1 µm or more, the flexibility of the elastomer resin can be enhanced and a cushioning property against deformation can be enhanced. On the other hand, among all the pores of the porous structure of the elastomer resin, the pore diameter of 60% or more of the pores is preferably 20 µm or less, more preferably 15 µm or less, and still more preferably 10 µm or less. When the pore diameter is 20 µm or less, the pore density of the porous structure can be increased, both flexibility and appropriate strength can be achieved, deformation force can be received by the entire elastomer resin, and thus, the sheet-like material can be a sheet-like material having excellent flexibility and folding crease resistance.

It is a preferred embodiment that the elastomer resin used in the present invention is present in the interior space of the nonwoven fabric, from a viewpoint that the microfibers are gripped on each other and preferably the sheet-like material has piloerection on at least one surface thereof.

Next, a method of producing the sheet-like material of the present invention will be described.

As means for obtaining the microfiber used in the present invention, direct spinning or using a microfiber expression type fiber is possible, and among them, it is a preferred embodiment to use a microfiber expression type fiber. As the microfiber expression-type fiber, a sea-island type composite fiber in which a thermoplastic resin of two components having different solubilities in a solvent has a sea component and an island component, and only the sea component is dissolved and removed using a solvent and the like to form the island component into a microfiber, and a peeling type composite fiber or a multilayer composite layer in which thermoplastic resins of two components are alternately arranged radially in a fiber section or in layers and each component is peeled off and split so that the fiber is split into the microfiber, can be adopted; however, a sea-island type composite fiber is preferably used due to the uniform product quality.

Examples of the sea component of the sea-island composite fiber include polyolefins such as polyethylene and polypropylene, polystyrene, copolymerized polyester obtained by copolymerizing sodium sulfoisophthalate, polyethylene glycol, and the like, polylactic acid, polyvinyl alcohol, a copolymer thereof, or the like.

Microfiber formation processing (sea elimination processing) of the sea-island type composite fiber can be carried out by immersing the sea-island composite fiber in a solvent and squeezing it. As the solvent dissolving the sea component, organic solvents such as toluene and trichloroethylene, alkaline aqueous solutions such as sodium hydroxide, or hot water can be used.

The microfiber formation processing can be performed using an apparatus such as a continuous dyeing machine, a vibro-washer type sea elimination machine, a liquid flow dyeing machine, a jigger dyeing machine, and the like.

Dissolution and removal of the sea component can be performed at any timing before and after application of the elastomer resin. When the sea elimination processing is carried out before application of the elastomer resin, a structure in which the elastomer resin is closely adhered directly to the microfiber is formed, so that the microfiber can be strongly gripped, and thus, the abrasion resistance of the sheet-like material becomes better. Meanwhile, when the sea elimination processing is carried out after application of the elastomer resin, voids caused by the sea component from sea elimination are produced between the elastomer resin and the microfiber, and thus, the microfiber is not gripped directly by the elastomer resin and texture of the sheet-like material is flexible.

The mass ratio of the sea component to the island component in the sea-island type composite fiber used in the present invention is preferably in a range of sea component: island component=10:90 to 80:20. When the mass ratio of the sea component is less than 10% by mass, microfineness of the island component is insufficient. Further, when the mass ratio of the sea component is more than 80% by mass, the proportion of the eluting component is high, and the productivity becomes low. The mass ratio of the sea component to the island component is more preferably in a range of sea component:island component=20:80 to 70:30.

In the present invention, when the microfiber expression type fiber represented by the sea-island type composite fiber is drawn, either method of winding an undrawn yarn once, and then separately drawing the yarn, or taking off the undrawn yarn and continuously drawing the yarn as it is, can be adopted. Drawing can be appropriately carried out by a method of drawing in one to three stages, by moist heat, dry heat, or both of them. Next, the drawn sea-island type composite fiber is preferably subjected to crimp processing, and is cut into a predetermined length to obtain a raw stock of the nonwoven fabric. A normal method can be used for crimp processing or cut processing.

It is preferred that buckling crimping is applied to the composite fiber such as a sea-island type composite fiber used in the present invention. This is because by the buckling crimping, entanglement between fibers when a short fiber nonwoven fabric is formed is improved and high density and high entanglement are possible. In order to apply buckling crimping to the composite fiber, a normal stuffing box type crimping is preferably used, but in order to obtain a crimp retention coefficient preferred in the present invention, it is a preferred embodiment to appropriately adjust a processing fineness, a crimper temperature, a crimper load, a pushing pressure, and the like.

The crimp retention coefficient of the microfiber expression type fiber to which buckling crimping is applied is preferably in a range of 3.5 to 15, and more preferably in a range of 4 to 10. When the crimp retention coefficient is 3.5 or more, it is possible to improve rigidity in the thickness direction of the nonwoven fabric at the time of forming the nonwoven fabric and maintain the entanglement in an entangling step such as a needle punch. Further, when the crimp retention coefficient is 15 or less, openability of a fiber web in carding is excellent without too much crimping.

The crimp retention coefficient referred to herein is represented by the following equation:

$$\text{Crimp retention coefficient} = (W/L - L0) \div 2$$

W: crimp disappearance load (load when crimp has been extended: mg/dtex)

L: fiber length under crimp disappearance load (cm)

L0: fiber length under 6 mg/dtex (cm) 30.0 cm is marked.

The measurement method is as follows. First, a load of 100 mg/dtex is applied to a sample, then the load is increased in increments of 10 mg/dtex, and a crimp state is confirmed. The added load until the crimp is extended, and the length of the marking (elongation from 30.0 cm) in a state in which the crimp is extended, are measured.

A single fiber fineness of the composite fiber used in the present invention is preferably in a range of 2 to 10 dtex, and more preferably in a range of 3 to 9 dtex, from a viewpoint of the entanglement such as a needle punching step.

The composite fiber used in the production of the sheet-like material of the present invention has a shrinkage rate at a temperature of 98° C. of preferably 5 to 40%, and more preferably 10 to 35%. Within the range of the shrinkage rate, the fiber density can be improved by hot water processing, and a sense of fulfillment like genuine leather can be obtained.

Specifically, in a method of measuring a shrinkage rate, first, a load of 50 mg/dtex is applied to a bundle of composite fibers and 30.0 cm is marked (L0). Thereafter, processing is performed in hot water at a temperature of 98° C. for 10 minutes, a length (L1) before and after the processing is measured, and $[(L0-L1)/L0] \times 100$ is calculated. Measurement is carried out three times, and the average value is taken as a shrinkage rate.

In the present invention, the number of fibers in the microfiber bundle is preferably 8 to 1000/bundle, and more preferably 10 to 800/bundle. When the number of the fibers is 8/bundle or more, the denseness of the microfiber is good, and for example, there is a tendency to express mechanical properties such as abrasion. Further, when the number of fibers is 1000/bundle or less, openability at the time of napping is good, a fiber distribution on a napped surface becomes uniform, and product quality becomes good.

As a method of obtaining the nonwoven fabric which is the fiber entangled body constituting the sheet-like material of the present invention, a method of entangling a composite fiber web by a needle punch or a water jet punch, a spun bond method, a melt blow method, a papermaking method, and the like can be adopted, and among them, a method of going through a processing by a needle punch or a water jet punch in an embodiment of the microfiber bundle as described above, is preferably used.

As described above, the nonwoven fabric may be laminated and integrated with the woven or knitted fabric, and a method of integrating them by a needle punch, a water jet punch, or the like is preferably used.

In the needles used in the needle punch processing, the number of needle barbs (cut outs) is preferably 1 to 9. By having preferably one or more needle barbs, efficient fiber entanglement is possible. Meanwhile, fiber damage can be suppressed by having preferably 9 or less needle barbs.

The number of composite fibers caught by the barbs is determined by the shape of the barb and the diameter of the composite fiber. Therefore, the barb shape of the needle used in the needle punch step having a kickup of 0 to 50 μm, an undercut angle of 0 to 400, a throat depth of 40 to 80 μm, and a throat length of 0.5 to 1.0 mm, is preferably used.

Further, the number of punchings is preferably 1000 to 8000/cm². When the number of punchings is preferably 1000/cm² or more, denseness can be obtained and high precision finish can be obtained. Meanwhile, when the number of punchings is preferably 8000/cm² or less, deterioration of processability, fiber damage, and strength reduction can be prevented.

Further, when the water jet punch processing is performed, it is preferred to perform the processing in the state that water is in a columnar flow. Specifically, it is a preferred embodiment that water is ejected at a pressure of 1 to 60 MPa from a nozzle having a diameter of 0.05 to 1.0 mm.

It is preferred that the apparent density of the nonwoven fabric after the needle punch processing or the water jet punch processing is 0.15 to 0.45 g/cm³. When the apparent density is preferably 0.15 g/cm³ or more, sufficient form stability and dimensional stability of the sheet-like material can be obtained. Meanwhile, when the apparent density is preferably 0.45 g/cm³ or less, a sufficient space for applying the elastomer resin can be maintained.

It is a preferred embodiment that the nonwoven fabric obtained as such is shrunk by dry heat, wet heat, or both and is further highly densified, from a viewpoint of densification. Further, the nonwoven fabric can be compressed in the thickness direction, by calendering or the like.

In the present invention, the polyurethane resin which is the elastomer resin is applied to the nonwoven fabric, but the polyurethane resin can be applied both the nonwoven fabric including the composite fiber and the nonwoven fabric formed into the microfiber.

When the solvent of polyurethane is an organic solvent, coagulation can be performed by dry thermal coagulation, wet coagulation, or a combination thereof, and among them, wet coagulation which is coagulation by immersion in water is preferably used. By using wet coagulation, the polyurethane resin is not concentrated at an entanglement point of the microfiber, and in order that the polyurethane resin itself is also made porous, a degree of freedom between microfibers is increased, whereby a flexible sheet-like material can be obtained. Further, when the dispersion medium of the polyurethane resin is water, coagulation can be performed by dry thermal coagulation, wet thermal coagulation, or a combination thereof.

It is excellent in production efficiency and is a preferred embodiment that after the elastomer resin is applied to the nonwoven fabric which is a fiber entangled body, the resulting elastomer resin-applied sheet-like material is split into several pieces or several sheets in the thickness direction of the sheet-like material.

It is a preferred embodiment of the sheet-like material of the present invention that at least one surface of the sheet-like material has piloerection.

Raising processing for forming piloerection of the microfiber on the surface of the sheet-like material of the present invention can be performed by a method such as grinding using a sandpaper or a roll paper. Before the raising processing, a lubricant such as a silicone emulsion may be applied to the sheet-like material.

Further, it is a more preferred embodiment that when an antistatic agent is applied before the raising processing, it tends to be difficult for grinding powder generated from the sheet-like material by grinding to be deposited on the sandpaper.

The sheet-like material can be dyed depending on the application. As a method of dyeing the sheet-like material, it is preferred to use a liquid flow dyeing machine, since the sheet-like material is dyed and at the same time the sheet-like material imparting a kneading effect can be flexible. When the dyeing temperature of the sheet-like material is too high, the elastomer resin may be deteriorated, and on the contrary, when the dyeing temperature is too low, dyeing on the fiber is insufficient, and thus, it is preferred to set the dyeing temperature depending on the type of fibers. The dyeing temperature is preferably 80 to 150° C., and more preferably 110 to 130° C.

Dyes can be selected depending on the type of fibers constituting the sheet-like material. For example, in the case of a polyester-based fiber, a disperse dye can be used, and in the case of a polyamide-based fiber, an acid dye or a metal-containing dye can be used, and also, a combination thereof can be used.

Further, it is a preferred embodiment to use a dyeing assistant at the time of dyeing the sheet-like material. By using the dyeing assistant, the uniformity and reproducibility of dyeing can be improved. Further, after a bath with dyeing or dyeing, a finishing treatment using a softener such as silicone, an antistatic agent, a water repellent, a flame retardant, a light-resistant agent, an antibacterial agent and the like can be performed.

The sheet-like material of the present invention can be preferably used for furniture, chairs and wall coverings, seating in the interior of vehicles such as cars, trains and aircrafts, skin materials such as ceilings and interiors, interior materials having a very elegant appearance, clothing, industrial materials, and the like.

EXAMPLES

Next, the sheet-like material of the present invention will be described in more detail, using the Examples.

[Evaluation Method]

[1] Intrinsic Viscosity IV of Polyester:

measured at a temperature of 25° C. using orthochlorophenol as a solvent.

[2] Thermal Stability Index ($\Delta IV$) of Polyester:

6.0 g of a sample (intrinsic viscosity (IVa)), which was dried at 150° C.×20 hours×under vacuum (133 Pa or less) beforehand, was extruded under the following setting conditions, using a melt indexer (MX-101B) manufactured by Takara Industry Co., Ltd.

Load: 1000 g
Orifice inner diameter: 2.092 mmφ
Measured distance: 25.4 mm
Cylinder portion temperature×protection time: 295° C.×60 minutes A thermal stability index ($\Delta IV$), which is an index of an intrinsic viscosity decrease at the time of melting was determined by the following equation, from the intrinsic viscosity (IVb) of a mixture which was obtained by mixing the chipped polymer collected from the start of measurement to the end of measurement, after maintaining the temperature at 295° C. for 60 minutes, after starting extrusion.

$$\Delta IV = (IVa) - (IVb)$$

[3] Melting Point of Polyester:

A peak top temperature representing melting of a polymer in the 2nd run was taken as the melting point of the polymer, using DSC-7 manufactured by PerkinElmer Inc. (Perkin Elmer). The temperature rising rate at this time was 16° C./min, and the sample amount was 10 mg. Measurement was performed twice, and the average value was taken as the melting point.

[4] Melt Flow Rate (MFR) of Polyester:

4 to 5 g of a sample was placed in a cylinder of an MFR meter electric furnace, and an amount (g) of the resin extruded in 10 minutes was measured, under the condition of a load of 2160 gf and a temperature of 285° C., using a melt indexer (S101) manufactured by Toyo Seiki. The same measurement was repeated three times, and the average value was taken as MFR.

[5] Content of Diethylene Glycol (DEG) in Polyester:

2-aminoethanol was used as a solvent, and 1,6-hexanediol which was an internal standard material was added and decomposed at a temperature of 260° C. After cooling, methanol was added and then neutralized with an acid, and the precipitate was filtered. The filtrate was measured by gas chromatography (manufactured by Shimadzu Corporation, GC-14B)

[6] Content of 1,2-Propanediol-Derived Component in Polyester:

First, 1000 μg/ml of an aqueous solution of 1,2-butanediol was prepared and used as an internal standard solution A. 0.1 g of a sample was weighed into a vial, 0.015 ml of the internal standard solution A and 1 ml of ammonia water were added and sealed, heated at 150° C. for 3 hours, and then allowed to be cooled to a temperature of 25° C. Subsequently, 2 ml of methanol and 2.0 g of terephthalic acid were added, shaken for 15 minutes, and centrifuged at 4000 G for 3 minutes. The supernatant was taken out, measurement was performed under the following setting conditions, by gas chromatography (5890 series II, manufactured by Hewlett Packard, inlet: split/splitless inlet, detector: hydrogen flame ionization detector), and the content was determined using the calibration curve described later.

Injector temperature: 220° C.
Column head pressure: 20 psi
Carrier gas: helium
Sample introduction method: split (linear flow velocity 25 ml/min)
Barrier purge: helium 3.0 ml/min
Introduced sample amount: 1.0 μl
Detector temperature: 220° C.
Gas flow rate: hydrogen 40 ml/min, air 400 ml/min, and nitrogen 40 ml/min
Oven temperature rise start temperature: 60° C. (protection time 2 minutes)
Oven temperature rise stop temperature: 220° C. (protection time 2 minutes)
Oven temperature rise rate: 20° C./min (straight slop)

The calibration curve of 1,2-propanediol was created in the following steps. After a 1000 μg/ml aqueous solution of 1,2-propanediol was prepared as a standard mother liquor B, 0.003 to 0.08 ml of the standard mother liquor B and 0.025 ml of an internal standard solution A were added to a 5 ml volumetric flask, and seven standard solutions C which was made up to a volume with a mixed solvent (methanol: purified water=2:1, containing 1.1% of ethylene glycol) were prepared with changed amounts of the standard mother liquor B. In addition, the amount of the added standard mother liquor B was selected so that 1,2-propanediol has a sufficient concentration for measurement. The prepared standard solutions C were measured by gas chromatography under the above conditions, respectively, and then a peak area ratio of the resulting 1,2-propanediol and the internal standard material and a concentration ratio of 1,2-propanediol and the internal standard material in the standard solution C were plotted on a graph to create a calibration curve of 1,2-propanediol.

[7] Content of 1,2-Propanediol of Ethylene Glycol:

About 0.15 g of ethylene glycol was weighed, and dissolved and made up to a volume using acetone in a 5 ml volumetric flask. The prepared solution was measured under the following setting conditions, by gas chromatography (5890 series II, manufactured by Hewlett Packard, inlet: split/splitless inlet, detector: hydrogen flame ionization detector), and using 1,2-propanediol instead of the sample, the content was determined using the calibration curve measured and created in the same operation.

Injector temperature: 250° C.
Column head pressure: 15 psi
Carrier gas: helium
Sample introduction method: split (linear flow velocity 50 ml/min)
Barrier purge: helium 3.0 ml/min
Introduced sample amount: 1.0 µl
Detector temperature: 250° C.
Gas flow rate: hydrogen 40 ml/min, air 400 ml/min, and nitrogen 40 ml/min
Oven temperature rise start temperature: 50° C. (protection time 3 minutes)
Oven temperature rise stop temperature: 250° C. (protection time 1 minute)
Oven temperature rise rate: 15° C./min (straight slop)

[8] Melting Point (Tm) and Heat of Fusion ($\Delta H$) of Polycarbonate Diol

A sample (polycarbonate diol) was measured with a differential scanning calorimeter (manufactured by TA Instruments, Model No.: Q20) according to the method of JIS K 7121-1987. The melting point (Tm) and the heat of fusion ($\Delta H$) were determined as follows: the following operation was performed: raising temperature from a temperature of 20° C. to a temperature of 80° C. at a rate of 10° C./min, maintaining the temperature of 80° C. for 10 minutes, then performing cooling to the temperature of 20° C. at a rate of 10° C./min, maintaining the temperature of 20° C. for 10 minutes, and then raising the temperature again to the temperature of 80° C. at a rate of 10° C./min, according to the method of JIS K 7121-1987, and the melting point was determined from the melting peak at the second temperature rise and the heat of fusion was determined from a heat balance of the melting peak.

[9] Viscosity of Polyurethane Resin Solution:

A sample (polyurethane resin solution) was temperature-controlled in a constant temperature water bath at a temperature of 20° C. for 5 hours, and then measured by a B-type viscometer [BH type viscometer manufactured by TOKI SANGYO CO., LTD.], No. 7 rotor, at a rotation speed of 20 rpm.

[10] Average Single Fiber Diameter of Microfiber in Sheet-Like Material:

Three cross sections perpendicular to the thickness direction including the fibers of the sheet-like material were observed at 3000 times using a scanning electron microscope (SEM, VE-7800 type manufactured by KEYENCE CORPORATION), and the single fiber diameter of 50 microfibers which were randomly extracted within a 30 µm×30 µm field per one cross section was measured in µm to the first decimal place. The diameters of a total of 150 single fibers of three cross sections were measured, and the average value was calculated to the first decimal place. When the fibers having a fiber diameter of more than 50 µm are mixed, the fibers do not correspond to the microfibers and are excluded from the measurement subject of an average fiber diameter. Further, when the microfiber has a modified cross section, the cross sectional area of the single fiber was first measured, and the diameter of the single fiber was determined by calculating the diameter when the cross section was regarded as being circular. The average value was calculated using this as the population and taken as the average single fiber diameter.

[11] Single Fiber Diameter of Yarn Constituting the Woven or Knitted Fabric

The woven or knitted fabric was cut in the thickness direction, the single fiber diameter of the yarn constituting the woven or knitted fabric was observed by the scanning electron microscope (SEM VE-7800 type manufactured by KEYENCE CORPORATION) at 1000 times, and the single fiber diameter was evaluated with the average value measured at 10 points.

[12] Strength Retention of Woven or Knitted Fabric:

The tensile strength of the woven or knitted fabric in the sheet substrate obtained by entanglement and integration of the woven or knitted fabric before punching and the woven or knitted fabric with the nonwoven fabric was determined by the following method. A specimen of 20 cm in height and 5 cm in width was cut, respectively from the woven or knitted fabric single substance and the woven or knitted fabric before punching from which the nonwoven fabric portion was removed, and according to Method A of JIS L 1096 (1999), using a Tensilon tensile tester, the specimen was grasped at a gripping distance of 10 cm and was stretched at a constant speed of 10 cm/min to measure the strength in the vertical direction. Each measurement was performed three times and the average value was calculated.

The measured value of the woven or knitted fabric single substance from which the nonwoven fabric portion was removed was divided by the measured value of the woven or knitted fabric before punching to determine the strength retention as a percentage, and the strength retention of 70% or more is judged as being passed, and the strength retention less than 70% is judged as being failed.

[13] Piloerection Quality of Sheet-Like Material

For the resulting sheet-like material, a total of 20 people made up of 10 healthy adult males and 10 healthy adult females were selected as evaluators, and the sensory evaluation of the visual appearance of the sheet-like material and the feel (touch) of the sheet-like material was performed in the following five steps, and the most frequent evaluation was taken as piloerection quality. Piloerection quality of S to A was good.

S: piloerection of fibers is uniform, the dispersion state of fibers is good, and the feel is smooth.
A: piloerection of fibers is uniform, and the dispersion state of fibers is slightly poor, but the feel is almost smooth.
B: piloerection of fibers is slightly non-uniform, the dispersion state of fibers is slightly poor, and the feel is slightly rough.
C: piloerection of fibers is non-uniform, the dispersion state of fibers is poor, and the feel is rough.

[14] Flexibility of Sheet-Like Material (Cantilever Method):

Based on Method A (45° cantilever method) described in 8.21.1 of 8.21, "bending resistance" of JIS L 1096:2010, "Fabric test method of woven fabric and knit fabric", 5 sheets of specimens of 2×15 cm were created in the vertical and horizontal directions, respectively, and placed on a horizontal table with a 45° slope, and the specimens were slid and the scale when the center of one end of the specimen contacts the slope was read, and the average value of 5 sheets was determined.

[15] Flexibility of Sheet-Like Material (Sensory Method):

For the flexibility of the resulting sheet-like material, sensory evaluation was performed by 20 healthy men and women. The sheet-like material was cut into a circle of φ 250 mm, judgement was performed in one step within the following range of 5 to 1, by the tactile sensation when held by the palm, and the average value of 20 people was determined. The evaluation result was 4.0 or more, and the flexibility was good.

5: having flexibility and a suitable sense of repulsion.
4: having flexibility and a sense of repulsion, which was but slightly less.
3: having some flexibility and a less sense of repulsion.
2: having no flexibility and a slight sense of repulsion, or having some flexibility and no sense of repulsion.
1: having no flexibility and being hard, having no sense of repulsion, and being paper-like.

[16] Abrasion Evaluation of Sheet-Like Material:

Model 406 manufactured by James H. Heal & Co. was used as a Martindale abrasion tester, and ABRASIVE CLOTH SM25 manufactured by the same company was used as a standard abrading cloth. After applying a loading of 12 kPa to the sheet-like material and performing abrasion 20,000 times, the appearance of the sheet-like material was visually observed to evaluate the pill (pilling). The evaluation criteria was as follows: those having no change in appearance of the sheet-like material were granted grade 5, and those having many pills were granted grade 1, and the range therebetween was divided by 0.5 grade each.

Further, the mass of the sheet-like material before and after abrasion was used to calculate the abrasion loss by the following equation.

Abrasion loss (mg)=mass before abrasion (mg)−mass after abrasion (mg)

[17] Average Pore Diameter of Porous Structure of Elastomer Resin and Proportion of Micropores Having a Pore Diameter of 0.1 to 20 μm Occupying the Entire Pores of the Porous Structure:

A cross section perpendicular to the thickness direction of the nonwoven fabric including elastomer resin of the sheet-like material was observed at 2000 times using a scanning electron microscope (SEM, VE-7800 type manufactured by KEYENCE CORPORATION), and the pore diameter (diameter) of 50 pores in the elastomer resin which were randomly extracted within a 40 μm×40 μm field was measured in μm to the first decimal place. The pore diameters of a total of 150 pores in the three observation cross sections were measured and the average of 150 diameters was determined. Further, a proportion of the number of pores having a pore diameter of 0.1 to 20 μm occupying 150 pores was calculated, which was taken as a proportion of the micropores of 0.1 to 20 μm occupying the porous structure. Further, when the pores in the elastomer resin are deformed pores, the cross sectional area of the pores was first measured, and the pore diameter (diameter) of the pores was determined by calculating the diameter when the cross section was regarded as being circular.

[Description of Chemical Material]

The meanings of the abbreviations of the chemical materials used in the following Reference Examples are as follows.

EG: ethylene glycol
TPA: terephthalic acid
DMT: dimethyl terephthalate
SSIA: sodium 5-sulfoisophthalate
BG: 1,4-butanediol
MDI: 4,4'-diphenylmethane diisocyanate
HDI: hexamethylene diisocyanate
DMF: N,N-dimethylformamide
DMPA: 2,2-dimethylol propionic acid

[Raw Materials Used in Polymerization]

The raw materials used in polymerization are as follows.

Plant-derived ethylene glycol: manufactured by Changchun Dacheng Industrial Group Company LTD. (ethylene glycol=98.138% by mass, 1,2-propanediol=5410 ppm, 1,2-butanediol=2390 ppm, 2,3-butanediol=6310 ppm, 1,4-butanediol=4510 ppm)

Fossil fuel-derived ethylene glycol: manufactured by Mitsubishi Chemical Corporation (ethylene glycol=99.989% by mass, 1,2-propanediol<1 ppm (not detected), diethylene glycol=110 ppm)

Terephthalic acid: high-purity terephthalic acid manufactured by Mitsui Chemicals, Inc. (1,2-propanediol<1 ppm (not detected))

Dimethyl terephthalate: manufactured by SK Chemicals (1,2-propanediol<1 ppm (not detected))

Reference Example 1: Purification of Plant-Derived Ethylene Glycol (EG-1)

The obtained 20 kg of biomass resource-derived ethylene glycol (EG) was subjected to distillation operation under the conditions of the theoretical plate number of 40, a pressure of 50 mmHg, and a flux ratio of 10 to obtain crude ethylene glycol as a column bottom residue (including 1,2-propanediol: 3520 ppm). The resulting crude ethylene glycol was heated to a set temperature of 190° C. for 15 hours in a heating pot, and then was cooled to a temperature of 25° C.

Meanwhile, activated carbon (manufactured by FUTAMURA CHEMICAL CO., LTD: Taiko SGA) was washed with soft water and then dried, and the activated carbon after drying was filled in an activated carbon processing facility. The activated carbon layer had a thickness of 300 cm, a space velocity was 0.57 $hr^{-1}$, and the plant-derived ethylene glycol which was cooled after the heating was flowed into the activated carbon layer and then collected. Finally, plant-derived ethylene glycol (EG-1) having the content of 1,2-propanediol of 220 ppm was obtained.

Reference Example 2: Purification of Plant-Derived Ethylene Glycol (EG-2)

Plant-derived ethylene glycol (EG-2) having the content of 1,2-propanediol of 910 ppm was finally obtained, in the same manner as in Reference Example 1, except that the thickness of the activated carbon layer was 200 cm and the space velocity was 0.86 $hr^{-1}$.

Reference Example 3: Purification of Plant-Derived Ethylene Glycol (EG-3)

Plant-derived ethylene glycol (EG-3) having the content of 1,2-propanediol of 50 ppm was finally obtained in the same manner as in Reference Example 1, except that the heat treatment time of crude ethylene glycol after distillation operation was 30 hours, the thickness of the activated carbon layer was 500 cm, and the space velocity was 0.34 $hr^{-1}$.

Reference Example 4: Purification of Plant-Derived Ethylene Glycol (EG-4)

Plant-derived ethylene glycol was heated to a set temperature of 190° C. for 10 hours in a heating pot, and then was cooled to a temperature of 25° C.

Meanwhile, activated carbon was washed with soft water and then dried, and the activated carbon after drying was filled in an activated carbon processing facility. The activated carbon layer had a thickness of 150 cm, a space velocity was 1.14 $hr^{-1}$, and the plant-derived ethylene glycol which was cooled after the heating was flowed into the activated carbon layer and then collected. Finally, plant-derived ethylene glycol (crude product) having the content of 1,2-propanediol of 2790 ppm was obtained.

Reference Example 5: Purification of Plant-Derived Ethylene Glycol (EG-5)

The obtained 20 kg of plant-derived ethylene glycol was subjected to the first distillation operation under the conditions of the theoretical plate number of 30, a pressure of 50 mmHg, and a flux ratio of 5 to obtain crude ethylene glycol as a column bottom residue (including 1,2-propanediol: 4180 ppm). Subsequently, the second distillation was carried out under the conditions of the theoretical plate number of 30, a pressure of 50 mmHg, and a flux ratio of 5. Finally, biomass resource-derived ethylene glycol (EG-5) having the content of 1,2-propanediol of 3020 ppm was obtained as a column bottom residue.

Reference Example 6: Fossil Fuel-Derived Ethylene Glycol (EG-6)

1,2-propanediol was not detected (less than 1 ppm) from the fossil fuel-derived ethylene glycol (manufactured by Mitsubishi Chemical Corporation, EG-6).

Reference Example 7: Synthesis of Polymer (PET-1)

The plant-derived ethylene glycol (EG-1) obtained in Reference Example 1 was all used as the ethylene glycol used in Reference Example 7.

About 100 kg of bis(hydroxyethyl) terephthalate obtained from dimethyl terephthalate and ethylene glycol was charged, a slurry of 82.5 kg of terephthalic acid and 35.4 kg of ethylene glycol was supplied over 4 hours to an esterification reaction tank maintained at a temperature of 250° C. and a pressure of 1.2×100,000 Pa, and even after completion of the supply, the esterification reaction was carried out for another 1 hour, and 101.5 kg of the resulting esterification reaction product was transferred to a polycondensation tank.

After the transfer, antimony trioxide equivalent to 250 ppm in terms of an antimony atom and trimethyl phosphate equivalent to 20 ppm in terms of a phosphorus atom with respect to the resulting polymer were added to the esterification product as an ethylene glycol solution. Furthermore, after 5 minutes, an ethylene glycol slurry of titanium oxide particles were added in an amount equivalent to 0.1% by weight in terms of titanium oxide particles with respect to the resulting polymer. Thereafter, the reaction system was depressurized while stirring at 30 rpm to start the reaction. The temperature inside the reactor was gradually raised from 250° C. to 280° C., and the pressure was lowered to 110 Pa. The time to reach the final temperature and the final pressure was set to 60 minutes. When a predetermined stirring torque was reached, the reaction system was purged with nitrogen and returned to normal pressure to stop the polycondensation reaction, the product was discharged in a strand shape, cooled, and then immediately cut to obtain a pellet of a polymer (PET-1). The characteristics of the resulting polymer are summarized in Table 1.

Reference Example 8: Synthesis of Polymer (PET-2)

The biomass resource-derived ethylene glycol (EG-1) obtained in Reference Example 1 was all used as the ethylene glycol used in Reference Example 8.

Magnesium acetate equivalent to 60 ppm in terms of a magnesium atom with respect to the resulting polymer, 100 kg of dimethyl terephthalate, and 58 kg of ethylene glycol were melted under a nitrogen atmosphere at 150° C. and heated to the temperature of 230° C. for 3 hours while stirring, methanol was distilled off, and the transesterification was carried out to obtain bis(hydroxyethyl)terephthalate. This was transferred to a polycondensation tank.

After the transfer, antimony trioxide equivalent to 250 ppm in terms of an antimony atom and trimethyl phosphate equivalent to 50 ppm in terms of a phosphorus atom with respect to the resulting polymer were previously mixed in ethylene glycol in another mixing tank 30 minutes before the addition and stirred at room temperature for 30 minutes, and then the mixture was added. Further, after 5 minutes, an ethylene glycol slurry of titanium oxide particles was added to the resulting polymer in an amount equivalent to 0.1% by mass in terms of titanium oxide particles with respect to the resulting polymer. After 5 minutes, the reaction system was depressurized to start the reaction. The temperature inside the reactor was gradually raised from 250° C. to 280° C., and the pressure was lowered to 110 Pa. The time to reach the final temperature and the final pressure was set to 60 minutes. At the time when a predetermined stirring torque was reached, the reaction system was purged with nitrogen and returned to normal pressure to stop the polycondensation reaction, the product was discharged in a strand shape, cooled, and then immediately cut to obtain a pellet of a polymer (PET-2). The time from starting depressurization to reaching the predetermined stirring torque was 3 hours and 30 minutes. The characteristics of the resulting polymer are summarized in Table 1.

Reference Examples 9 and 10: Synthesis of Polymers (PET-3 and PET-4)

Polymer (PET-3 and PET-4) pellets were obtained in the same manner as in Reference Example 7, except that the ethylene glycol used was changed as shown in Table 1. The results are summarized in Table 1.

Reference Example 11: Synthesis of Polymer (PET-5)

A polymer (PET-5) pellet was obtained in the same manner as in Reference Example 8, except that the polymerization catalyst used and the used amount thereof, the added amount of titanium oxide, and sodium 5-sulfoisophthalate dimethyl ester equivalent to 8 mol %, based on the entire dicarboxylic acid component constituting the resulting polymer were added to the esterification product. The results are summarized in Table 1.

Reference Example 12: Synthesis of Polymer (PET-6)

A polymer pellet was obtained in the same manner as in Reference Example 7, except that sodium 5-sulfoisophthalate dimethyl ester equivalent to 5 mol % based on the entire dicarboxylic acid component constituting the resulting polymer was added to the esterification product. The results are summarized in Table 1.

Reference Example 13: Synthesis of Polymer (PET-7)

A polymer (PET-7) pellet was obtained in the same manner as in Reference Example 7, except that the ethylene glycol used was changed as shown in Table 1. The results are summarized in Table 1.

Reference Example 14: Synthesis of Polymer (PET-8)

A polymer pellet was obtained in the same manner as in Reference Example 11, except that ethylene glycol used was changed as shown in Table 1. The results are summarized in Table 1.

Reference Examples 15 and 16: Synthesis of Polymers (PET-9 and PET-10)

Polymer (PET-9 and PET-10) pellets were obtained in the same manner as in Reference Example 7, except that ethylene glycol used was changed as shown in Table 1. The results are summarized in Table 1.

TABLE 1

| | | | Reference Example 7 | Reference Example 8 | Reference Example 9 | Reference Example 10 | Reference Example 11 |
|---|---|---|---|---|---|---|---|
| | Polymer | | PET-1 | PET-2 | PET-3 | PET-4 | PET-5 |
| | EG | | EG-1 | EG-1 | EG-2 | EG-3 | EG-1 |
| | Dicarboxylic acid component | | TPA | DMT | TPA | TPA | DMT |
| Copolymerization component | Type | | — | — | — | — | SSIA |
| | Content | mol % | — | — | — | — | 8 |
| Catalyst | Polymerization catalyst | — | $Sb_2O_3$ | $Sb_2O_3$ | $Sb_2O_3$ | $Sb_2O_3$ | Mannitol Ti |
| | Added amount (in terms of atom) | ppm | 250 | 250 | 250 | 250 | 5 |
| Additive | Phosphorus compound | — | TMPA | TMPA | TMPA | TMPA | TMPA |
| | Added amount (in terms of atom) | ppm | 20 | 50 | 20 | 20 | 50 |
| | Added amount of $TiO_2$ | % by mass | 0.1 | 0.1 | 0.1 | 0.1 | 0 |
| Characteristics of polymer | Intrinsic viscosity | IV | 0.72 | 0.71 | 0.72 | 0.72 | 0.65 |
| | | ⊿IV | 0.060 | 0.059 | 0.060 | 0.058 | 0.063 |
| | DEG content | % by mass | 1.3 | 1.5 | 1.3 | 1.2 | 1.7 |
| | 1,2-PD-derived component content | ppm | 52 | 51 | 204 | 16 | 49 |
| | Plant-derived ratio | % | 20 | 20 | 20 | 20 | 20 |

| | | | Reference Example 12 | Reference Example 13 | Reference Example 14 | Reference Example 15 | Reference Example 16 |
|---|---|---|---|---|---|---|---|
| | Polymer | | PET-6 | PET-7 | PET-8 | PET-9 | PET-10 |
| | EG | | EG-1 | EG-4 | EG-4 | EG-5 | EG-6 |
| | Dicarboxylic acid component | | TPA | TPA | DMT | TPA | TPA |
| Copolymerization component | Type | | SSIA | — | SSIA | — | — |
| | Content | mol % | 5 | — | 8 | — | — |
| Catalyst | Polymerization catalyst | — | $Sb_2O_3$ | $Sb_2O_3$ | Mannitol Ti | $Sb_2O_3$ | $Sb_2O_3$ |
| | Added amount (in terms of atom) | ppm | 250 | 250 | 5 | 250 | 250 |
| Additive | Phosphorus compound | — | TMPA | TMPA | TMPA | TMPA | TMPA |
| | Added amount (in terms of atom) | ppm | 20 | 20 | 50 | 20 | 20 |
| | Added amount of $TiO_2$ | % by mass | 0.1 | 0.1 | 0 | 0.1 | 0.1 |
| Characteristics of polymer | Intrinsic viscosity | IV | 0.72 | 0.71 | 0.65 | 0.71 | 0.71 |
| | | ⊿IV | 0.060 | 0.130 | 0.128 | 0.130 | 0.134 |
| | DEG content | % by mass | 1.3 | 1.7 | 1.9 | 1.8 | 1.9 |
| | 1,2-PD-derived component content | ppm | 52 | 628 | 609 | 690 | at or below detection limit |
| | Plant-derived ratio | % | 20 | 20 | 20 | 20 | 0 |

Reference Example 17: Synthesis of Polyurethane Resin (D-1)

In a four-neck flask equipped with a stirrer and a thermometer, 100 parts of 1,10-decanediol (a2-1)/1,4-butanediol (a1-1) (mol % ratio: 91/9) copolymerized polycarbonate diol (A1-1) having a number average molecular weight of 1,979 (hydroxyl value of 56.7), 100 parts of 3-methyl-pentanediol (a3-1)/1,6-hexanediol (a3-2) (mol % ratio: 50/50) copolymerized polycarbonate diol (A2-1) having a number average molecular weight of 2,000 (hydroxyl value of 56.1), 7.6 parts of EG (C-1), 61.6 parts of MDI (B-1), and 628 parts of DMF were charged and reacted under a dry nitrogen atmosphere at a temperature of 70° C. for 15 hours to obtain a solution of polyurethane resin (D-1) having a resin concentration of 30% by mass, a viscosity of 80,000 mPa·s/20° C., and a coagulation value of 3.8.

Reference Example 18: Synthesis of Polyurethane Resin (D-2)

In the same reaction vessel as in Reference Example 17, 140 parts of 1,10-decanediol (a2-1)/1,4-butanediol (a1-1) (mol % ratio: 81/19) copolymerized polycarbonate diol (A1-2) having a number average molecular weight of 2,018 (hydroxyl value of 55.6), 60 parts of 3-methyl-pentanediol (a3-1)/1,6-hexanediol (a3-2) (mol % ratio: 85/15) copolymerized polycarbonate diol (A2-2) having a number average molecular weight of 1,979 (hydroxyl value of 57.5), 9.6 parts of EG (C-1), 73.1 parts of MDI (B-1), and 660 parts of DMF were charged and reacted under a dry nitrogen atmosphere at a temperature of 65° C. for 20 hours to obtain a solution of polyurethane resin (D-2) having a resin concentration of 30% by mass, a viscosity of 95,000 mPa·s/20° C., and a coagulation value of 3.4.

Reference Example 19: Synthesis of Polyurethane Resin (D-3)

In the same reaction vessel as in Reference Example 17, 200 parts of 1,10-decanediol (a2-1)/1,4-butanediol (a1-1) (mol % ratio: 81/19) copolymerized polycarbonate diol (A1-2) having a number average molecular weight of 2,018 (hydroxyl value of 55.6), 8.6 parts of EG (C-1), 65.4 parts of MDI (B-1), and 648 parts of DMF were charged and reacted under a dry nitrogen atmosphere at a temperature of 70° C. for 15 hours to obtain a solution of polyurethane resin (D-3) having a resin concentration of 30% by mass, a viscosity of 90,000 mPa·s/20° C., and a coagulation value of 2.6.

Reference Example 20: Synthesis of Polyurethane Resin (D-4)

In the same reaction vessel as in Reference Example 17, 200 parts of 1,10-decanediol (a2-1)/1,4-butanediol (a1-1) (mol % ratio: 61/39) copolymerized polycarbonate diol (A1-3) having a number average molecular weight of 1,963 (hydroxyl value of 57.2), 8.6 parts of EG (C-1), 65.4 parts of MDI (B-1), and 648 parts of DMF were charged and reacted under a dry nitrogen atmosphere at a temperature of 70° C. for 15 hours to obtain a solution of polyurethane resin (D-4) having a resin concentration of 30% by mass, a viscosity of 89,000 mPa·s/20° C., and a coagulation value of 2.7.

Reference Example 21: Synthesis of Polyurethane Resin Aqueous Dispersion (P-1)

In a pressurizable vessel equipped with a stirrer and a thermometer, 120 parts of 1,10-decanediol (a2-1)/1,4-butanediol (a1-1) (mol % ratio: 71/29) copolymerized polycarbonate diol (A1-4) having a number average molecular weight of 1,989 (hydroxyl value of 56.4), 80 parts of 3-methyl-pentanediol (a3-1)/1,6-hexanediol (a3-2) (mol % ratio: 85/15) copolymerized polycarbonate diol (A2-2) having a number average molecular weight of 1,979 (hydroxyl value of 57.5), 8.9 parts of EG (C-1), 5.02 parts of DMPA (A3-1), 56.0 parts of HDI (B-2), and 112 parts of acetone were charged the reaction system was replaced with nitrogen gas, and then the reactants were reacted with stirring at a temperature of 80° C. for 12 hours to obtain an acetone solution of a terminal isocyanate group urethane prepolymer. The resulting acetone solution was cooled to a temperature of 25° C., and 742.9 parts of acetone as a dilution solvent and 7.1 parts of triethylamine as a neutralizing agent were added. 583.3 parts of water was added to the acetone solution and stirred with a homomixer for 1 minute to be emulsified, and then acetone was distilled off under reduced pressure, the solution was cooled to a temperature of 25° C., and water was added to adjust the solid content to 40% by mass, thereby obtaining a polyurethane resin aqueous dispersion (P-1).

Reference Example 22: Synthesis of Polyurethane Resin (D-5)

In the same reaction vessel as in Reference Example 17, 200 parts of 1,10-decanediol (a2-1)/1,4-butanediol (a1-1) (mol % ratio: 31/69) copolymerized polycarbonate diol (A1-5) having a number average molecular weight of 1,983 (hydroxyl value of 56.5), 12.5 parts of BG (C-2), 65.4 parts of MDI (B-1), and 648 parts of DMF were charged and reacted under a dry nitrogen atmosphere at a temperature of 70° C. for 15 hours to obtain a solution of polyurethane resin (D-5) having a resin concentration of 30% by mass, a viscosity of 87,000 mPa·s/20° C., and a coagulation value of 2.5.

Reference Example 23: Synthesis of Polyurethane Resin (D-6)

In the same reaction vessel as in Reference Example 17, 200 parts of 1,10-decanediol (a2-1) polycarbonate diol (A1-6) having a number average molecular weight of 2,036 (hydroxyl value of 55.1), 12.6 parts of BG (C-2), 66.0 parts of MDI (B-1), and 650 parts of DMF were charged and reacted under a dry nitrogen atmosphere at a temperature of 70° C. for 15 hours to obtain a solution of polyurethane resin (D-6) having a resin concentration of 30% by mass, a viscosity of 89,000 mPa·s/20° C., and a coagulation value of 2.3.

Reference Example 24: Synthesis of Polyurethane Resin (D-7)

In the same reaction vessel as in Reference Example 17, 140 parts of 1,10-decanediol (a2-1)/1,4-butanediol (a1-1) (mol % ratio: 31/69) copolymerized polycarbonate diol (A1-5) having a number average molecular weight of 1,983 (hydroxyl value of 56.5), 60 parts of 3-methyl-pentanediol (a3-1)/1,6-hexanediol (a3-2) (mol % ratio: 85/15) copolymerized polycarbonate diol (A2-2) having a number average molecular weight of 1,979 (hydroxyl value of 57.5), 13.9 parts of BG (C-2), 73.1 parts of MDI (B-1), and 660 parts of DMF were charged and reacted under a dry nitrogen atmosphere at a temperature of 65° C. for 20 hours to obtain a solution of polyurethane resin (D-7) having a resin concentration of 30% by mass, a viscosity of 88,000 mPa·s/20° C., and a coagulation value of 2.5.

Reference Example 25: Synthesis of Polyurethane Resin Aqueous Dispersion (P-2)

In the same reaction vessel as in Reference Example 21, 120 parts of 1,10-decanediol (a2-1)/1,4-butanediol (a1-1) (mol % ratio: 31/69) copolymerized polycarbonate diol (A1-5) having a number average molecular weight of 1,983 (hydroxyl value of 56.5), 80 parts of 3-methyl-pentanediol (a3-1)/1,6-hexanediol (a3-2) (mol % ratio: 85/15) copolymerized polycarbonate diol (A2-2) having a number average molecular weight of 1,979 (hydroxyl value of 57.5), 8.9 parts of EG (C-1), 5.02 parts of DMPA (A3-1), 56.0 parts of HDI (B-2), and 112 parts of acetone were charged, the reaction system was replaced with nitrogen gas, and then the reactants were reacted with stirring at a temperature of 80° C. for 12 hours to obtain an acetone solution of a terminal isocyanate group urethane prepolymer. The resulting acetone solution was cooled to a temperature of 25° C., and 742.9 parts of acetone as a dilution solvent and 7.1 parts of triethylamine as a neutralizing agent were added. 583.3 parts of water was added to the acetone solution and stirred with a homomixer for 1 minute to be emulsified, and then acetone was distilled off under reduced pressure, the solution was cooled to a temperature of 25° C., and water was added to adjust the solid content to 40% by mass, thereby obtaining a polyurethane resin aqueous dispersion (P-2).

The polyurethane resins of Reference Examples 17 to 25 are summarized in Table 2. 1,10-decanediol (a2-1) used in these Reference Examples were a plant-derived raw material, and the plant-derived ratio of the raw material was calculated based on the plant-derived ratio of the polyurethane resin, which is shown in Table 2.

TABLE 2

|  |  |  | Reference Example 17 | Reference Example 18 | Reference Example 19 | Reference Example 20 | Reference Example 21 |
|---|---|---|---|---|---|---|---|
|  | Polyurethane resin (D) |  | D-1 | D-2 | D-3 | D-4 | P-1 |
| Polycarbonate diol (A1) | Alkanediol (a1) | — | 1,4-butanediol | 1,4-butanediol | 1,4-butanediol | 1,4-butanediol | 1,4-butanediol |
|  | Alkanediol (a2) | — | 1,10-decanediol | 1,10-decanediol | 1,10-decanediol | 1,10-decanediol | 1,10-decanediol |
|  | Melting point (Tm) | ° C. | 51.2 | 47.2 | 47.2 | 40.0 | 43.8 |
|  | Heat of fusion (ΔH) | J/g | 68.1 | 61.5 | 61.5 | 48.2 | 54.8 |
|  | Molar ratio of (a2) relative to total of (a1) and (a2) | mol % | 91 | 81 | 81 | 61 | 71 |
| Polycarbonate diol (A2) | Alkanediol (a3) | — | 3-methyl-pentanediol | 3-methyl-pentanediol | — | — | 3-methyl-pentanediol |
|  |  | — | 1,6-hexanediol | 1,6-hexanediol | — | — | 1,6-hexanediol |
|  | Melting point (Tm) | ° C. | Not observed | Not observed | — | — | Not observed |
|  | Heat of fusion (ΔH) | J/g | 0 | 0 | — | — | 0 |
| Mass ratio of (A1) relative to mixture (A12) |  | % by mass | 50 | 70 | — | — | 60 |
| ΔTm of mixture (A12) and (A1) |  | ° C. | 0.8 | 0.9 | — | — | 0 |
| ΔH of mixture (A12) |  | J/g | 36.4 | 31.5 | — | — | 31.5 |
| Compound (A3) having hydrophilic group and active hydrogen |  | — | — | — | — | — | DMPA |
| Organic diisocyanate (B) |  | — | MDI | MDI | MDI | MDI | HDI |
| Chain extender (C) |  | — | EG | EG | EG | EG | EG |
| Plant-derived ratio of polyurethane resin |  | % by mass | 33 | 41 | 60 | 45 | 35 |

|  |  |  | Reference Example 22 | Reference Example 23 | Reference Example 24 | Reference Example 25 |
|---|---|---|---|---|---|---|
|  | Polyurethane resin (D) |  | D-5 | D-6 | D-7 | P-2 |
| Polycarbonate diol (A1) | Alkanediol (a1) | — | 1,4-butanediol | — | 1,4-butanediol | 1,4-butanediol |
|  | Alkanediol (a2) | — | 1,10-decanediol | 1,10-decanediol | 1,10-decanediol | 1,10-decanediol |
|  | Melting point (Tm) | ° C. | 28.9 | 55.7 | 28.9 | 28.9 |
|  | Heat of fusion (ΔH) | J/g | 28.2 | 78.9 | 28.2 | 28.2 |
|  | Molar ratio of (a2) relative to total of (a1) and (a2) | mol % | 31 | 100 | 31 | 31 |
| Polycarbonate diol (A2) | Alkanediol (a3) | — | — | — | 3-methyl-pentanediol | 3-methyl-pentanediol |
|  |  | — | — | — | 1,6-hexanediol | 1,6-hexanediol |
|  | Melting point (Tm) | ° C. | — | — | Not observed | Not observed |
|  | Heat of fusion (ΔH) | J/g | — | — | 0 | 0 |
| Mass ratio of (A1) relative to mixture (A12) |  | % by mass | — | — | 70 | 60 |

TABLE 2-continued

| | | | | | |
|---|---|---|---|---|---|
| ΔTm of mixture (A12) and (A1) | ° C. | — | — | 0.5 | 0 |
| ΔH of mixture (A12) | J/g | — | — | 16.5 | 16.5 |
| Compound (A3) having hydrophilic group and active hydrogen | — | — | — | — | DMPA |
| Organic diisocyanate (B) | — | MDI | MDI | MDI | HDI |
| Chain extender (C) | — | BG | BG | BG | EG |
| Plant-derived ratio of polyurethane resin | % by mass | 22 | 74 | 15 | 12 |

Example 1

(Nonwoven Fabric)

Polystyrene as a sea component and polymer PET-1 as an island component were used to obtain a sea-island type composite fiber with 20% by mass of the sea component and 80% by mass of the island component, having the number of islands of 16/1 filament and an average single fiber diameter of 20 μm. The resulting sea-island type composite fiber was cut to have a fiber length of 51 mm to form a staple, a fiber web was formed through a card and a cross wrapper, and needle punch processing was performed to produce a nonwoven fabric having a basis weight of 750 g/m² and a thickness of 3.2 mm.

(Microfiber Formation)

Operation of immersing the resulting nonwoven fabric in trichloroethylene and squeezing the nonwoven fabric with a mangle was repeated five times, thereby obtaining a sheet composed of a microfiber from which the sea component of the sea-island type composite fiber had been removed.

(Application of Polyurethane Resin)

The sheet composed of the microfiber obtained as described above was immersed in a polyurethane resin D-1 solution having a solid content concentration adjusted to 12% by mass, and then the polyurethane resin was coagulated in an aqueous solution having a DMF concentration of 30% by mass. Thereafter, the coagulation was dried by hot air at a temperature of 110° C. for 10 minutes to obtain a polyurethane resin-applied sheet having a thickness of 1.9 mm.

(Half-Cutting and Raising)

The polyurethane resin-applied sheet obtained as described above was cut in half vertically in the thickness direction, and a non-half-cut surface was ground with an endless sandpaper of sandpaper count number 240, thereby obtaining a sheet-like material having piloerection having a thickness of 0.75 mm.

(Dyeing and Finishing)

The sheet-like material having piloerection obtained as described above was dyed using a black dye under the condition of a temperature of 120° C., using a liquid flow dyeing machine, and then dried with a drier to obtain a sheet-like material having an average single fiber diameter of the microfiber of 4.4 μm. The resulting sheet-like material had uniform and elegant piloerection and flexible texture, and good abrasion resistance.

Examples 2 to 4

A sheet-like material was obtained in the same manner as in Example 1, except that the polymer of the island component in Example 1 was under the conditions in Table 3. The resulting sheet-like material had uniform and elegant piloerection and flexible texture, and good abrasion resistance.

Example 5

(Nonwoven Fabric)

Polymer-PET-5 as a sea component and polymer PET-1 as an island component were used to obtain a sea-island type composite fiber with 20% by mass of the sea component and 80% by mass of the island component, having the number of islands of 16/1 filament and an average single fiber diameter of 20 μm. The resulting sea-island type composite fiber was cut to have a fiber length of 51 mm to form a staple, a fiber web was formed through a card and a cross wrapper, and needle punch processing was performed to produce a nonwoven fabric having a basis weight of 730 g/m² and a thickness of 3.0 mm.

(Microfiber Formation)

The resulting nonwoven fabric was immersed in an aqueous sodium hydroxide solution having a concentration of 10 g/L, heated to a temperature of 95° C. and treated for 30 minutes to obtain a sheet composed of a microfiber from which the sea component of the sea-island type composite fiber was removed.

(Application of Polyurethane Resin)

The sheet composed of the microfiber obtained as described above was immersed in a polyurethane resin D-1 solution having a solid content concentration adjusted to 12% by mass, and then the polyurethane resin was coagulated in an aqueous solution having a DMF concentration of 30% by mass. Thereafter, the coagulation was dried by hot air at a temperature of 110° C. for 10 minutes to obtain a polyurethane resin-applied sheet having a thickness of 1.8 mm.

(Half-Cutting and Raising)

The polyurethane resin-applied sheet obtained as described above was cut in half vertically in the thickness direction, and a non-half-cut surface was ground with an endless sandpaper of sandpaper count number 240, thereby obtaining a sheet-like material having piloerection having a thickness of 0.7 mm.

(Dyeing and Finishing)

The sheet-like material having piloerection obtained as described above was dyed using a black dye under the condition of a temperature of 120° C., using a liquid flow dyeing machine, and then dried with a drier to obtain a sheet-like material having an average single fiber diameter of the microfiber of 4.4 μm. The resulting sheet-like material had uniform and elegant piloerection and flexible texture, and good abrasion resistance.

Example 6

A sheet-like material was obtained in the same manner as in Example 5, except that the polymer of the sea component in Example 5 was changed to PET-6. The resulting sheet-like material had uniform and elegant piloerection and flexible texture, and good abrasion resistance.

Example 7

A sheet-like material was obtained in the same manner as in Example 1, except that the polyurethane resin in Example 1 was changed to D-2. The resulting sheet-like material had uniform and elegant piloerection and flexible texture, and good abrasion resistance.

Examples 8 and 9

A sheet-like material was obtained in the same manner as in Example 1, except that the polyurethane resin in Example 1 was changed to D-3 and D-4, respectively. The resulting sheet-like material had uniform piloerection and flexible texture, and good abrasion resistance.

Example 10

(Application of Polyurethane Resin)

The sheet composed of a microfiber obtained in the same manner as in Example 5 was immersed in a polyurethane resin P-1 aqueous dispersion having a solid content concentration adjusted to 10% by mass, and then dried by hot air at a temperature of 110° C. for 15 minutes, thereby obtaining a polyurethane resin-applied sheet having a thickness of 1.8 mm.

(Half-Cutting and Raising)

The polyurethane resin-applied sheet obtained as described above was cut in half vertically in the thickness direction, and a non-half-cut surface was ground with an endless sandpaper of sandpaper count number 240, thereby obtaining a sheet-like material having piloerection having a thickness of 0.7 mm.

(Dyeing and Finishing)

The sheet-like material having piloerection obtained as described above was dyed using a black dye under the condition of a temperature of 120° C., using a liquid flow dyeing machine, and then dried with a drier to obtain a sheet-like material having an average single fiber diameter of the microfiber of 4.4 μm. The resulting sheet-like material had uniform piloerection and flexible texture, and good abrasion resistance.

Examples 11 and 12

A sheet-like material was obtained in the same manner as in Example 1, except that the average single fiber diameter of the microfiber in Example 1 was 2.0 μm and 5.5 μm. The resulting sheet-like material had uniform and elegant piloerection and flexible texture, and good abrasion resistance.

Example 13

A sheet-like material was obtained in the same manner as in Example 1, except that in Example 1, a web was inserted upper and lower portions of a woven fabric of plain weave texture having the single fiber diameter of the yarn of 10 μm for both warp yarn and weft yarn, the twist number of 2000 T/m, and a woven density of 95×76 (vertical×horizontal) per 2.54 cm (1 inch), which was produced from a yarn spun with polymer PET-1, needle punch processing is performed in a laminated state of woven fabric/fiber web/woven fabric, the nonwoven fabric having a basis weight of 750 g/m$^2$ and a thickness of 3.1 mm was produced, and the polyurethane resin-applied sheet was cut in half vertically in the thickness direction and the half-cut surface was ground. The resulting sheet-like material had uniform and elegant piloerection and flexible texture, had good abrasion resistance, had high strength retention of the woven fabric, and was flexible but had good strength.

Examples 14 and 15

A sheet-like material was obtained in the same manner as in Example 13, except that the single fiber diameter of the yarn of the woven fabric in Example 13 was changed to 6.0 μm and 25 μm, respectively. The resulting sheet-like material had uniform and elegant piloerection and flexible texture, had good abrasion resistance, had high strength retention of the woven fabric, and was flexible but had good strength.

Examples 16 to 18

A sheet-like material was obtained in the same manner as in Example 13, except that the polymer of the yarn of the woven fabric in Example 13 was changed to PET-2, PET-3, and PET-4. The resulting sheet-like material had uniform and elegant piloerection and flexible texture, had good abrasion resistance, had high strength retention of the woven fabric, and was flexible but had good strength.

Example 19

A sheet-like material was obtained in the same manner as in Example 13, except that the twist number of the yarn of the woven fabric in Example 13 was changed to 3000 T/m. The resulting sheet-like material had uniform and elegant piloerection and flexible texture, had good abrasion resistance, had high strength retention of the woven fabric, and was flexible but had good strength.

The sheet-like materials of Examples 1 to 19 are summarized in Table 3.

TABLE 3

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Island component polymer | | PET-1 | PET-2 | PET-3 | PET-4 | PET-1 | PET-1 | PET-1 | PET-1 | PET-1 | PET-1 |
| Sea component polymer | | Polystyrene | Polystyrene | Polystyrene | Polystyrene | PET-5 | PET-6 | Polystyrene | Polystyrene | Polystyrene | PET-5 |
| Polyurethane (D) | | D-1 | D-1 | D-1 | D-1 | D-1 | D-1 | D-2 | D-3 | D-4 | P-1 |
| Woven or knitted fabric polymer | | — | — | — | — | — | — | — | — | — | — |
| Piloerection quality | | S | S | S | S | S | S | S | A | A | A |
| Average single fiber diameter of microfiber | μm | 4.4 | 4.4 | 4.4 | 4.4 | 4.4 | 4.4 | 4.4 | 4.4 | 4.4 | 4.4 |
| Average single fiber diameter of warp yarn of woven or knitted fabric | μm | — | — | — | — | — | — | — | — | — | — |
| Average single fiber diameter of weft yarn of woven or knitted fabric | μm | — | — | — | — | — | — | — | — | — | — |

TABLE 3-continued

|  |  |  |  |  |  |  |  |  |  |  |
|---|---|---|---|---|---|---|---|---|---|---|
| Twist number of yarn of woven or knitted fabric | T/m | — | — | — | — | — | — | — | — | — |
| Warp strength retention of woven or knitted fabric | % | — | — | — | — | — | — | — | — | — |
| Weft strength retention of woven or knitted fabric | % | — | — | — | — | — | — | — | — | — |
| Flexibility (cantilever method) | mm | 26 | 26 | 26 | 26 | 25 | 25 | 28 | 39 | 40 | 38 |
| Abrasion loss | mg | 4.2 | 4.2 | 4.2 | 4.2 | 4.3 | 4.4 | 4.6 | 5.2 | 5.4 | 4.3 |
| Pilling evaluation | Grade | 4.5 | 4.5 | 4.5 | 4.5 | 4.0 | 4.0 | 4.0 | 4.0 | 4.0 | 4.0 |
| Average pore diameter of porous structure | μm | 3.1 | 3.2 | 3.1 | 3.0 | 3.1 | 3.0 | 3.8 | 8.4 | 11.3 | 13.0 |
| Micropore ratio of porous structure | % | 81 | 80 | 81 | 82 | 81 | 82 | 78 | 72 | 66 | 63 |

|  |  | Example 11 | Example 12 | Example 13 | Example 14 | Example 15 | Example 16 | Example 17 | Example 18 | Example 19 |
|---|---|---|---|---|---|---|---|---|---|---|
| Island component polymer | | PET-1 | PET-1 | PET-1 | PET-1 | PET-1 | PET-1 | PET-1 | PET-1 | PET-1 |
| Sea component polymer | | Polystyrene | Polystyrene | Polystyrene | Polystyrene | Polystyrene | Polystyrene | Polystyrene | Polystyrene | Polystyrene |
| Polyurethane (D) | | D-1 | D-1 | D-1 | D-1 | D-1 | D-1 | D-1 | D-1 | D-1 |
| Woven or knitted fabric polymer | | — | — | PET-1 | PET-1 | PET-1 | PET-2 | PET-3 | PET-4 | PET-1 |
| Piloerection quality | | S | S | S | S | S | S | S | S | S |
| Average single fiber diameter of microfiber | μm | 2.0 | 5.5 | 4.4 | 4.4 | 4.4 | 4.4 | 4.4 | 4.4 | 4.4 |
| Average single fiber diameter of warp yarn of woven or knitted fabric | μm | — | — | 10 | 6.0 | 25 | 10 | 10 | 10 | 10 |
| Average single fiber diameter of weft yarn of woven or knitted fabric | μm | — | — | 10 | 6.0 | 25 | 10 | 10 | 10 | 10 |
| Twist number of yarn of woven or knitted fabric | T/m | — | — | 2000 | 2000 | 2000 | 2000 | 2000 | 2000 | 3000 |
| Warp strength retention of woven or knitted fabric | % | — | — | 83 | 72 | 84 | 81 | 74 | 71 | 85 |
| Weft strength retention of woven or knitted fabric | % | — | — | 86 | 74 | 85 | 85 | 77 | 73 | 87 |
| Flexibility (cantilever method) | mm | 24 | 27 | 28 | 27 | 30 | 28 | 27 | 27 | 30 |
| Abrasion loss | mg | 4.4 | 4.0 | 4.2 | 4.2 | 4.2 | 4.2 | 4.2 | 4.2 | 4.2 |
| Pilling evaluation | Grade | 4.5 | 4.5 | 4.5 | 4.5 | 4.5 | 4.5 | 4.5 | 4.5 | 4.5 |
| Average pore diameter of porous structure | μm | 3.3 | 3.0 | 3.1 | 3.0 | 3.1 | 3.2 | 3.1 | 3.1 | 3.1 |
| Micropore ratio of porous structure | % | 80 | 81 | 81 | 82 | 81 | 80 | 81 | 81 | 81 |

By including a specific amount of 1,2-propanediol in the polymer of the island component, a sheet-like material having improved heat resistance and suppressing a decrease in an intrinsic viscosity to have excellent abrasion resistance, can be obtained. Further, the polyurethane resin has a specific composition, thereby capable of having a porous structure having micropores and enhancing flexibility of the sheet-like material. Furthermore, by combining the fibers and the elastomer resin, a sheet-like material having uniform and elegant piloerection can be obtained by excellent abrasion resistance of the fiber and high grindability of the elastomer resin.

Furthermore, by including a certain amount of 1,2-propanediol in the polymer of the fiber entangled and integrated with the nonwoven fabric, the heat resistance of the polymer is improved, a decrease in an intrinsic viscosity is suppressed, abrasion resistance is enhanced, strength retention of the woven fabric in needle punch processing can be enhanced, and a sheet-like material being flexible and having high strength as well as having the above characteristics can be obtained.

Comparative Example 1

A sheet-like material was obtained in the same manner as in Example 1, except that in Example 1, the polymer of the island component was changed to PET-7 and the polyurethane resin was changed to D-3. Since the polymer PET-7 of the island component contained 1,2-propanediol in an excessive amount, the heat resistance of the polymer was insufficient and the resulting sheet-like material had a relatively flexible texture, but had poor abrasion resistance due to a non-uniform piloerection state.

Comparative Examples 2 and 3

A sheet-like material was obtained in the same manner as in Comparative Example 1, except that in Comparative Example 1, the polymer of the island component was changed to PET-9 and PET-10, respectively. Since the polymer PET-9 of the island component contained 1,2-propanediol in an excessive amount and the polymer PET-10 had 1,2-propanediol at or below a detection limit, the heat resistance of the polymer was insufficient and the resulting sheet-like material had a relatively flexible texture, but had poor abrasion resistance due to a non-uniform piloerection state.

Comparative Example 4

A sheet-like material was obtained in the same manner as in Example 5, except that in Example 5, the polymer of the island component was changed to PET-7, the polymer of the sea component was changed to PET-8, and the polyurethane resin was changed to D-3. Since the polymer PET-7 of the island component contained 1,2-propanediol in an excessive amount, the heat resistance of the polymer was insufficient, the resulting sheet-like material had a relatively flexible texture, but had poor abrasion resistance due to a non-uniform piloerection state.

Comparative Examples 5 to 7

A sheet-like material was obtained in the same manner as in Example 1, except that in Example 1, the polyurethane resin was changed to D-5, D-6, and D-7, respectively. Since in the polyurethane resins D-5 and D-7, the molar ratio of the polycarbonate diol (a2) was low, and in the polyurethane resin D-6, the molar ratio of the polycarbonate diol (a2) was high, the polyurethane resin was hard and formation of the microporous structure having micropores was insufficient, and the grindability of the polyurethane resin was lowered, and thus, the resulting sheet-like material had poor flexibility and abrasion resistance due to a partially non-uniform piloerection state.

Comparative Example 8

A sheet-like material was obtained in the same manner as in Example 10, except that the polyurethane resin in Example 10 was changed to P-2. In the polyurethane resin P-2, the molar ratio of the polycarbonate diol (a2) was low, the polyurethane resin was hard and the porous structure having micropores could not be formed, and the grindability of the polyurethane resin was lowered, and thus, the resulting sheet-like material had poor flexibility and abrasion resistance due to a non-uniform piloerection state. Further, a porous structure in the elastomer resin (polyurethane resin) in the sheet-like material could not be confirmed.

Comparative Examples 9 and 10

A sheet-like material was obtained in the same manner as in Comparative Example 1, except that in Comparative Example 1, the polyurethane resin was changed to D-5 and D-6, respectively. Since the polymer PET-7 of the island component contained 1,2-propanediol in an excessive amount, the heat resistance of the polymer was insufficient, and since in the polyurethane resin D-5, the molar ratio of the polycarbonate diol (a2) was low, and in the polyurethane resin D-6, the molar ratio of the polycarbonate diol (a2) was high, the polyurethane resin was hard and formation of the microporous structure having micropores was insufficient, and the grindability of the polyurethane resin was lowered, and thus, the resulting sheet-like material had poor flexibility and abrasion resistance due to a non-uniform piloerection state.

Comparative Example 11

A sheet-like material was obtained in the same manner as in Comparative Example 5, except that in Comparative Example 5, a web was inserted upper and lower portions of a woven fabric of plain weave texture having the single fiber diameter of the yarn of 10 μm for both warp yarn and weft yarn, the twist number of 2000 T/m, and a woven density of 95×76 (vertical×horizontal) per 2.54 cm (1 inch), which was produced from a yarn spun with polymer PET-7, needle punch processing is performed in a laminated state of woven fabric/fiber web/woven fabric, the nonwoven fabric having a basis weight of 750 g/m² and a thickness of 3.1 mm was produced, and the polyurethane resin-applied sheet was cut in half vertically in the thickness direction and the half-cut surface was ground. Since the polyurethane resin was hard, formation of the microporous structure having micropores was insufficient, and grindability of the polyurethane resin was lowered, the resulting sheet-like material had poor flexibility and abrasion resistance due to a partially non-uniform piloerection state, and further, since the polymer PET-7 of the woven fabric contained 1,2-propanediol in an excess amount, the abrasion resistance of the polymer was insufficient, the heat resistance of the polymer was low, the strength retention of the woven fabric was lowered, and the strength of the sheet-like material was insufficient.

Comparative Example 12

A sheet-like material was obtained in the same manner as in Comparative Example 11, except that the polymer of the yarn of the woven fabric in Comparative Example 11 was changed to PET-10. Since the polyurethane resin was hard, formation of the microporous structure having micropores was insufficient, and grindability of the polyurethane resin was lowered, the resulting sheet-like material had poor flexibility and abrasion resistance due to a partially non-uniform piloerection state, and further, since the polymer PET-10 of the woven fabric contained 1,2-propanediol at or below a detection limit, the abrasion resistance of the polymer was insufficient, the heat resistance of the polymer was low, the strength retention of the woven fabric was lowered, and the strength of the sheet-like material was insufficient.

Comparative Examples 13 and 14

A sheet-like material was obtained in the same manner as in Comparative Example 11, except that the twist number of the yarn of the woven fabric in Comparative Example 11 was changed to 500 T/m and 5000 T/m, respectively. Since the polyurethane resin was hard, formation of the microporous structure having micropores was insufficient, and grindability of the polyurethane resin was lowered, the resulting sheet-like material had poor flexibility and abrasion resistance due to a partially non-uniform piloerection state, and further, since the polymer PET-7 of the woven fabric contained 1,2-propanediol in an excess amount, the abrasion resistance of the polymer was insufficient, the heat resistance of the polymer was low, the strength retention of the woven fabric was lowered, and the strength of the sheet-like material was insufficient. When the twist number of the yarn of the woven fabric was small, the strength retention was further lowered and the strength of the sheet-like material was insufficient. When the twist number was large, the strength retention was slightly improved, but the flexibility of the sheet-like material was further reduced.

The sheet-like materials of Comparative Examples 1 to 14 are summarized in Table 4.

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Island component polymer |  | PET-7 | PET-9 | PET-10 | PET-7 | PET-1 | PET-1 | PET-1 |
| Sea component polymer |  | Polystyrene | Polystyrene | Polystyrene | PET-8 | Polystyrene | Polystyrene | Polystyrene |
| Polyurethane (D) |  | D-3 | D-3 | D-3 | D-3 | D-5 | D-6 | D-7 |
| Woven or knitted fabric polymer |  | — | — | — | — | — | — | — |
| Piloerection quality |  | C | C | C | C | B | B | B |
| Average single fiber diameter of microfiber | μm | 4.4 | 4.4 | 4.4 | 4.4 | 4.4 | 4.4 | 4.4 |
| Average single fiber diameter of warp yarn of woven or knitted fabric | μm | — | — | — | — | — | — | — |
| Average single fiber diameter of weft yarn of woven or knitted fabric | μm | — | — | — | — | — | — | — |
| Twist number of yarn of woven or knitted fabric | T/m | — | — | — | — | — | — | — |
| Warp strength retention of woven or knitted fabric | % | — | — | — | — | — | — | — |
| Weft strength retention of woven or knitted fabric | % | — | — | — | — | — | — | — |
| Flexibility (cantilever method) | mm | 39 | 40 | 39 | 40 | 51 | 56 | 65 |
| Abrasion loss | mg | 6.3 | 6.5 | 6.3 | 6.5 | 6.1 | 5.7 | 4.9 |
| Pilling evaluation | Grade | 3.5 | 3.5 | 3.5 | 3.0 | 2.5 | 2.5 | 3.0 |
| Average pore diameter of porous structure | μm | 8.4 | 8.4 | 8.4 | 8.5 | 38.0 | 71.8 | 19.4 |
| Micropore ratio of porous structure | % | 72 | 72 | 72 | 71 | 30 | 14 | 52 |

|  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Island component polymer |  | PET-1 | PET-7 | PET-7 | PET-1 | PET-1 | PET-1 | PET-1 |
| Sea component polymer |  | PET-5 | Polystyrene | Polystyrene | Polystyrene | Polystyrene | Polystyrene | Polystyrene |
| Polyurethane (D) |  | P-2 | D-5 | D-6 | D-5 | D-5 | D-5 | D-5 |
| Woven or knitted fabric polymer |  | — | — | — | PET-7 | PET-10 | PET-7 | PET-7 |
| Piloerection quality |  | C | C | C | B | B | B | B |
| Average single fiber diameter of microfiber | μm | 4.4 | 4.4 | 4.4 | 4.4 | 4.4 | 4.4 | 4.4 |
| Average single fiber diameter of warp yarn of woven or knitted fabric | μm | — | — | — | 10 | 10 | 10 | 10 |
| Average single fiber diameter of weft yarn of woven or knitted fabric | μm | — | — | — | 10 | 10 | 10 | 10 |
| Twist number of yarn of woven or knitted fabric | T/m | — | — | — | 2000 | 2000 | 500 | 5000 |
| Warp strength retention of woven or knitted fabric | % | — | — | — | 60 | 63 | 56 | 68 |
| Weft strength retention of woven or knitted fabric | % | — | — | — | 64 | 67 | 60 | 69 |
| Flexibility (cantilever method) | mm | 68 | 51 | 56 | 52 | 53 | 50 | 55 |
| Abrasion loss | mg | 4.6 | 6.7 | 6.4 | 6.2 | 6.1 | 6.2 | 6.2 |
| Pilling evaluation | Grade | 3.5 | 2.0 | 2.0 | 2.5 | 2.5 | 2.5 | 2.5 |
| Average pore diameter of porous structure | μm | Non-porous | 38.5 | 71.5 | 38.4 | 38.7 | 38.4 | 38.4 |
| Micropore ratio of porous structure | % | Non-porous | 30 | 15 | 29 | 28 | 29 | 29 |

When the amount of 1,2-propanediol in the polymer of the island component is in an excess amount or at or below the detection limit, an effect of improving the heat resistance of the polymer is insufficient and a decrease in an intrinsic viscosity becomes large, whereby the abrasion resistance of the sheet-like material is poor. Meanwhile, when the molar ratio of the polycarbonate diol (a2) in the polyurethane resin is out of the specific range, the polyurethane resin becomes hard, the formation of the porous structure having micropores becomes insufficient, and the flexibility of the sheet-like material is poor. Furthermore, due to the decrease in the abrasion resistance of the fiber and the decrease in the grindability of the elastomer resin, the sheet-like material becomes non-uniform piloerection and has a damaged appearance.

Further, when the amount of the 1,2-propanediol in the polymer of the woven fabric entangled and integrated with the nonwoven fabric is in an excessive amount or at or below the detection limit, the effect of improving the heat resistance of the polymer becomes insufficient, a decrease in an intrinsic viscosity is large, so that the abrasion resistance is lowered, the strength retention of the woven or knitted fabric in the needle punch processing is lowered, and the strength of the sheet-like material is impaired. Further, when the twist number of the yarn of the woven or knitted fabric is too small, the strength retention of the woven or knitted fabric is further lowered. Meanwhile, when the twist number is too large, the woven or knitted fabric is not flexible and the flexibility of the sheet-like material is impaired.

Example 20

<Raw Stock>
(Island Component Polymer)
As the island component polymer, the polymer PET-1 manufactured in Reference Example 7 was used.
(Sea Component Polymer)
As the sea component polymer, polystyrene (PSt) having a Vicat softening point of 102° C. and MFR of 67.8 was used.
(Polymer of Fiber Constituting Woven or Knitted Fabric)
As polymer of the fiber constituting the woven or knitted fabric the polymer PET-1 manufactured in Reference Example 7 was used.
(Spinning and Drawing)
The above island component polymer and the sea component polymer, and a sea-island type composite spinneret of 16 island/hole were used to perform melt spinning under the conditions of a spinning temperature of 285° C., an island/sea mass ratio of 80/20, a discharge amount of 1.4 g/min·hole, and a spinning speed of 1200 m/min.

Next, in a liquid bath at a temperature of 85° C., two-step drawing was performed so that a total magnification was 2.8 times, and a stuffing box-type crimper was used to apply crimp, thereby obtaining a sea-island type composite fiber. The thus-obtained sea-island type composite fiber had a single fiber fineness of 4.2 dtex. The sea-island type composite fiber was cut to have a fiber length of 51 mm to obtain a raw stock of the sea-island type composite fiber.

<Entangled Body of Nonwoven Fabric and Woven Fabric (Sheet Substrate)>
The raw stock composed of the above sea-island type composite fiber was used to form a laminated fiber web by a carding step and a cross wrapper step and 17 sheets were laminated. Next, a laminated fiber web was inserted upper and lower portions of a woven fabrics of plain weave texture having a single fiber diameter of the yarn of 10 μm for both warp yarn and weft yarn (total fineness of 84 dtex—72 filaments), the twist number of 2000 T/m, and a woven density of 95×76 (vertical×horizontal) per 2.54 cm (1 inch), which was produced from a yarn made of Polymer PET-1 produced in Reference Example 7, a needle punch machine in which one needle with a total barbed depth of 0.075 mm was implanted was used to perform needle punch processing with a needle depth of 7 mm and the number of punches of 3000/cm$^2$ in a laminated state of woven fabric/fiber web/woven fabric, and the woven fabric having a basis weight of 700 g/m$^2$ and an apparent density of 0.243 g/cm$^3$ was laminated, entangled, and integrated with the nonwoven fabric composed of the sea-island type composite fiber to manufacture a sheet substrate. The resulting sheet substrate was found to have excellent strength retention.

<Sheet-Like Material>
The sheet substrate was shrunk by hot water at a temperature of 98° C., then impregnated with an aqueous solution of PVA (polyvinyl alcohol) having a concentration of 5%, and dried by hot air at a temperature of 120° C. for 10 minutes, thereby obtaining a sheet substrate having a PVA mass of 6% by mass relative to the mass of the sheet substrate. The sheet substrate was immersed in trichloroethylene to dissolve and remove the sea component, and the nonwoven fabric composed of the microfiber and the woven fabric was entangled to obtain a sea-eliminated sheet. The sea-eliminated sheet composed of the woven fabric and the nonwoven fabric composed of the microfiber obtained as described above was immersed in a dimethylformamide (DMF) solution of polycarbonate-based polyurethane adjusted to have a solid content concentration of 12%, and then the polyurethane was coagulated in an aqueous solution having a DMF concentration of 30%. Thereafter, PVA and DMF were removed by hot water and drying by hot air at a temperature of 110° C. was performed for 10 minutes, thereby obtaining an elastomer resin-applied sheet substrate having a polyurethane mass of 28% by mass relative to the total mass of the woven fabric and the microfiber composed of the island component. Thereafter, the sheet substrate was cut in half in the thickness direction by half-cutting with an endless band knife, and the half-cut surface was ground in three steps using a sandpaper of JIS #No. 180 to produce a sheet-like material having piloerection formed thereon. The single fiber diameter of the microfiber was 4.4 μm.

Furthermore, a circular dyeing machine was used to dye the sheet-like material by a dispersion dye to obtain a sheet-like material. The resulting sheet-like material had excellent flexibility. The results are shown in Table 5.

Example 21

A sheet substrate was produced and then a sheet-like material was produced in the same manner as in Example 20, except that a woven fabric of plain weave texture having a single yarn diameter of a yarn of 6.0 μm for both warp yarn and weft yarn (total fineness 110 dtex—288 filaments), the twist number of 2000 T/m, and a woven density of 95×76 (vertical×horizontal) per 2.54 cm (1 inch) was used as the woven fabric. The resulting sheet-like material had excellent flexibility. The results are shown in Table 5.

Example 22

A sheet substrate was produced and then an artificial leather (product) was produced in the same manner as in Example 20, except that a woven fabric of plain weave texture having a single yarn diameter of a yarn of 25 μm for both warp yarn and weft yarn (total fineness 112 dtex—16 filaments), the twist number of 2000 T/m, and a woven density of 95×76 (vertical×horizontal) per 2.54 cm (1 inch) was used as the woven fabric. The resulting artificial leather (product) had excellent flexibility. The results are shown in Table 5.

Example 23

A sheet substrate was produced and then a sheet-like material was produced in the same manner as in Example 20, except that the polymer PET-2 produced in Reference Example 8 was used as the polymer forming the woven fabric. The resulting sheet-like material had excellent flexibility. The results are shown in Table 5.

Example 24

A sheet substrate was produced and then a sheet-like material was produced in the same manner as in Example 20, except that the polymer PET-3 produced in Reference Example 9 was used as the polymer forming the woven fabric. The resulting sheet-like material had excellent flexibility. The results are shown in Table 5.

Example 25

A sheet substrate was produced and then a sheet-like material was produced in the same manner as in Example 20, except that the polymer PET-4 produced in Reference Example 10 was used as the polymer forming the woven fabric. The resulting sheet-like material had excellent flexibility. The results are shown in Table 5.

Example 26

A sheet substrate was produced and then a sheet-like material was produced in the same manner as in Example 20, except that a woven fabric of plain weave texture having the twist number of 3000 T/m was used as the woven fabric. The resulting sheet-like material had excellent flexibility. The results are shown in Table 5.

Comparative Example 17

A sheet substrate was produced in the same manner as in Comparative Example 15, except that a woven fabric of plain weave texture having the twist number of 500 T/m was used as the woven fabric. The sheet substrate had poor strength retention.

A sheet-like material was produced from the sheet substrate. The results are shown in Table 6.

TABLE 5

| | | Example 20 | Example 21 | Example 22 | Example 23 | Example 24 | Example 25 | Example 26 |
|---|---|---|---|---|---|---|---|---|
| Island component polymer | | PET-1 | PET-1 | PET-1 | PET-1 | PET-1 | PET-1 | PET-1 |
| Mass ratio of island component/ sea component | | 80/20 | 80/20 | 80/20 | 80/20 | 80/20 | 80/20 | 80/20 |
| Woven or knitted fabric polymer | | PET-1 | PET-1 | PET-1 | PET-2 | PET-3 | PET-4 | PET-1 |
| Average single fiber diameter of microfiber | μm | 4.4 | 4.4 | 4.4 | 4.4 | 4.4 | 4.4 | 4.4 |
| Average single fiber diameter of warp yarn of woven or knitted fabric | μm | 10 | 6.0 | 25 | 10 | 10 | 10 | 10 |
| Average single fiber diameter of weft yarn of woven or knitted fabric | μm | 10 | 6.0 | 25 | 10 | 10 | 10 | 10 |
| Twist number of yarn of woven or knitted fabric | T/m | 2000 | 2000 | 2000 | 2000 | 2000 | 2000 | 3000 |
| Warp strength retention of woven or knitted fabric | % | 83 | 72 | 84 | 81 | 74 | 71 | 85 |
| Weft strength retention of woven or knitted fabric | % | 86 | 74 | 85 | 85 | 77 | 73 | 87 |
| Flexibility (sensory method) | — | 4.8 | 4.8 | 4.1 | 4.7 | 4.6 | 4.6 | 4.6 |

Comparative Example 15

A sheet substrate was produced in the same manner as in Example 20, except that the polymer PET-7 produced in Reference Example 13 was used as the polymer forming the woven fabric. The sheet substrate had poor strength retention.
A sheet-like material was produced from the sheet substrate. The results are shown in Table 6.

Comparative Example 16

A sheet substrate was produced in the same manner as in Example 20, except that the polymer PET-10 produced in Reference Example 16 was used as the island component polymer, and the polymer PET-10 produced in Reference Example 16 was used as the polymer forming the woven fabric. The sheet substrate had poor strength retention.
A sheet-like material was produced from the sheet substrate. The results are shown in Table 6.

Comparative Example 18

A sheet substrate was produced in the same manner as in Comparative Example 15, except that a woven fabric of plain weave texture having the twist number of 5000 T/m was used as the woven fabric. The sheet substrate had poor strength retention.
A sheet-like material was produced from the sheet substrate. The results are shown in Table 6.

TABLE 6

| | | Comparative Example 15 | Comparative Example 16 | Comparative Example 17 | Comparative Example 18 |
|---|---|---|---|---|---|
| Island component polymer | | PET-1 | PET-10 | PET-1 | PET-1 |
| Mass ratio of island component/ sea component | | 80/20 | 80/20 | 80/20 | 80/20 |
| Woven or knitted fabric polymer | | PET-7 | PET-10 | PET-7 | PET-7 |
| Average single fiber diameter of microfiber | μm | 4.4 | 4.4 | 4.4 | 4.4 |
| Average single fiber diameter of warp yarn of woven or knitted fabric | μm | 10 | 10 | 10 | 10 |
| Average single fiber diameter of weft yarn of woven or knitted fabric | μm | 10 | 10 | 10 | 10 |
| Twist number of yarn of woven or knitted fabric | T/m | 2000 | 2000 | 500 | 5000 |
| Warp strength retention of woven or knitted fabric | % | 60 | 63 | 56 | 68 |
| Weft strength retention of woven or knitted fabric | % | 64 | 67 | 60 | 69 |
| Flexibility (sensory method) | — | 4.7 | 4.5 | 4.7 | 4.1 |

The invention claimed is:

1. An artificial leather comprising:
a nonwoven fabric including a microfiber having an average single fiber diameter of 0.3 to 7 μm; and
an elastomer resin,
wherein
a polymer constituting the microfiber is a polyester obtained from a dicarboxylic acid and/or an ester-forming derivative thereof and a diol,
a 1,2-propanediol-derived component is contained at 1 to 500 ppm in the polyester,
the elastomer resin is a polyurethane resin (D) including a copolymerized polycarbonate diol (A1) that includes a structural unit derived from an alkanediol (a1) having 3 to 5 carbon atoms and a structural unit derived from an alkanediol (a2) having 8 to 20 carbon atoms and that has a molar ratio of the alkanediol (a2) to a total number of moles of the alkanediol (a1) and the alkanediol (a2) of 50 to 95 mol %, an organic diisocyanate (B), and a chain extender (C) as essential constituent monomers,
the polyurethane resin (D) further includes a polycarbonate diol (A2) including a structural unit derived from an alkanediol (a3) having 4 to 6 carbon atoms as an essential constituent monomer, and
the elastomer resin has a porous structure and a proportion of micropores having a pore diameter of 0.1 to 20 μm occupying all pores of the porous structure is 60% or more.

2. An artificial leather comprising:
a sheet substrate formed by laminating and integrating a nonwoven fabric having a microfiber as a main body with a woven or knitted fabric; and
an elastomer resin,
wherein
the woven or knitted fabric is composed of fibers including a polyester as a main component, and
a 1,2-propanediol-derived component is contained at 1 to 500 ppm in the polyester,
wherein the elastomer resin is a polyurethane resin (D) including a copolymerized polycarbonate diol (A1) that includes a structural unit derived from an alkanediol (a1) having 3 to 5 carbon atoms and a structural unit derived from an alkanediol (a2) having 8 to 20 carbon atoms and that has a molar ratio of the alkanediol (a2) to a total number of moles of the alkanediol (a1) and the alkanediol (a2) of 50 to 95 mol %, an organic diisocyanate (B), and a chain extender (C) as essential constituent monomers,
wherein the polyurethane resin (D) further includes a polycarbonate diol (A2) including a structural unit derived from an alkanediol (a3) having 4 to 6 carbon atoms as an essential constituent monomer.

3. The artificial leather according to claim 2, wherein a single fiber diameter of a yarn forming the woven or knitted fabric is 0.3 to 50 μm.

* * * * *